(12) United States Patent
Meusel et al.

(10) Patent No.: US 9,982,766 B2
(45) Date of Patent: May 29, 2018

(54) CAMSHAFT

(71) Applicant: THYSSENKRUPP PRESTA TECCENTER AG, Eschen (LI)

(72) Inventors: Jürgen Meusel, Dittmannsdorf (DE); Uwe Dietel, Lichtentanne (DE); Bernd Mann, Zschopau (DE); Michael Kunz, Chemnitz (DE); Martin Lehmann, Mittelndorf (DE)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 0 days. days.

(21) Appl. No.: 14/889,359

(22) PCT Filed: May 6, 2014

(86) PCT No.: PCT/EP2014/001201
§ 371 (c)(1),
(2) Date: Nov. 5, 2015

(87) PCT Pub. No.: WO2014/180561
PCT Pub. Date: Nov. 13, 2014

(65) Prior Publication Data
US 2016/0084368 A1    Mar. 24, 2016

(30) Foreign Application Priority Data

May 7, 2013    (DE) ........................ 10 2013 007 741

(51) Int. Cl.
*F16H 53/00*    (2006.01)
*F01L 13/00*    (2006.01)
(Continued)

(52) U.S. Cl.
CPC .......... *F16H 53/02* (2013.01); *F01L 13/0036* (2013.01); *F01L 2001/0473* (2013.01); *F01L 2013/0052* (2013.01)

(58) Field of Classification Search
CPC ................... F01L 53/02; F01L 13/0036; F01L 2001/0473; F01L 2013/0052;
(Continued)

(56) References Cited

U.S. PATENT DOCUMENTS 4,332,222 A    6/1982 Papez
5,664,463 A *  9/1997 Amborn ............... B21D 53/845
                                                        123/90.6
(Continued)

FOREIGN PATENT DOCUMENTS

CN    102345476 A    2/2012
CN    102740993 A    10/2012
(Continued)

OTHER PUBLICATIONS

Machine translation of WO 2011/026562 A1 obtained on Dec. 1, 2016.*
(Continued)

*Primary Examiner* — Adam D Rogers
(74) *Attorney, Agent, or Firm* — thyssenkrupp North America, Inc.

(57) ABSTRACT

The invention relates to a camshaft comprising a support shaft formed as a hollow shaft. An inner shaft is arranged concentrically in the interior of the support shaft, wherein the inner shaft is rotatable relative to the support shaft. There is arranged on the support shaft a first cam segment with a first recess for receiving the support shaft, which cam segment is rotatable with respect to the support shaft and is connected in a rotationally conjoint manner to the inner shaft via a first opening in the support shaft. The first cam segment has at least two cam contours. The connection between the inner shaft and the first cam segment is furthermore configured such that the first cam segment is axially displaceable relative to the inner shaft and to the support shaft.

20 Claims, 15 Drawing Sheets

(51) Int. Cl.
*F16H 53/02* (2006.01)
*F01L 1/047* (2006.01)

(58) Field of Classification Search
CPC ......... F01L 13/0042; F01L 1/047; F01L 1/08; F01L 2001/34459; F01L 2001/34469; F01L 2001/34473; F16H 53/02; F16H 53/025; F16H 53/04; Y10T 74/2101
See application file for complete search history.

(56) References Cited

U.S. PATENT DOCUMENTS

| | | | | |
|---|---|---|---|---|
| 8,191,524 | B2* | 6/2012 | Elendt | F01L 13/0036 |
| | | | | 123/90.16 |
| 8,210,143 | B2* | 7/2012 | Meusel | F01L 1/047 |
| | | | | 123/90.17 |
| 8,387,579 | B2* | 3/2013 | Stolk | F01L 1/047 |
| | | | | 123/90.18 |
| 8,495,980 | B2* | 7/2013 | Scherzinger | F01L 1/047 |
| | | | | 123/90.17 |
| 8,584,639 | B2* | 11/2013 | Elendt | F01L 13/0036 |
| | | | | 123/90.18 |
| 8,695,547 | B2* | 4/2014 | Weinmeister | F01L 1/04 |
| | | | | 123/90.16 |
| 8,960,143 | B2* | 2/2015 | Meintschel | F01L 1/34 |
| | | | | 123/90.16 |
| 9,115,613 | B2* | 8/2015 | Deblaize | F01L 1/34413 |
| 9,273,571 | B2* | 3/2016 | Dietel | F01L 1/047 |
| 9,617,876 | B2* | 4/2017 | Dietel | F01L 1/047 |
| 2007/0034184 | A1* | 2/2007 | Dengler | F01L 1/08 |
| | | | | 123/90.17 |
| 2011/0180027 | A1* | 7/2011 | Hartlieb | F01L 1/053 |
| | | | | 123/90.6 |
| 2012/0024245 | A1 | 2/2012 | Nendel | |
| 2012/0138000 | A1* | 6/2012 | Schadel et al. | F01L 1/0532 |
| | | | | 123/90.18 |
| 2012/0227689 | A1 | 9/2012 | Bechtold | |
| 2013/0025554 | A1 | 1/2013 | Werler et al. | |
| 2014/0224199 | A1 | 8/2014 | Stolk | |
| 2014/0238184 | A1* | 8/2014 | Kunz | F16H 25/14 |
| | | | | 74/567 |
| 2015/0322827 | A1* | 11/2015 | Methley | F01L 1/185 |
| | | | | 123/90.16 |
| 2016/0138440 | A1* | 5/2016 | Kunz | F01L 1/047 |
| | | | | 123/90.17 |

FOREIGN PATENT DOCUMENTS

| | | | | |
|---|---|---|---|---|
| DE | 2822147 A1 | 11/1979 | | |
| DE | 19520117 A1 | 12/1996 | | |
| DE | 102004011586 A1 | 10/2004 | | |
| DE | 102007051739 A1 | 5/2009 | | |
| DE | 10 2009 034 990 A1 | 2/2011 | | |
| DE | 102010025099 A1 | 12/2011 | | |
| DE | 102010033087 A1 | 2/2012 | | |
| DE | 102011108728 A1 | 1/2013 | | |
| DE | 102011116653 A1 | 4/2013 | | |
| EP | 1696107 A1 | 8/2006 | | |
| WO | 2009/056427 A1 | 5/2009 | | |
| WO | WO 2011026562 A1 * | 3/2011 | | F01L 1/047 |
| WO | WO 2013041187 A1 * | 3/2013 | | F01L 1/053 |
| WO | 2013056768 A | 4/2013 | | |
| WO | WO 2015155115 A1 * | 10/2015 | | F01L 1/047 |
| WO | WO 2015176874 A1 * | 11/2015 | | F01L 1/047 |

OTHER PUBLICATIONS

German language International Search Report for International patent application No. PCT/EP2014/001201; mailing date Sep. 1, 2014.
English translation of International Search Report for International patent application No. PCT/EP2014/001201; mailing date Sep. 1, 2014.
English translation of the abstract of DE 102010025099 A1.
English translation of the abstract of DE 19520117 A1.
English translation of Abstract of DE 102009034990 A1.

* cited by examiner

US 9,982,766 B2

CAMSHAFT

CROSS REFERENCE TO RELATED APPLICATIONS

This application is a U.S. National Stage Entry of International Patent Application Ser. No. PCT/EP2014/001201, filed May 6, 2014, which claims priority to German patent application no. DE 102013007741.9 filed May 7, 2013 the entire contents of each of which are incorporated herein by reference.

FIELD

The invention relates to a camshaft for actuation of cylinder valves of an internal combustion engine.

BACKGROUND

In order to improve the efficiency of internal combustion engines, it is known to adapt the cams of a camshaft to the operating condition of the internal combustion engine. For example, DE 10 2004 011 586 A1 shows a displacement cam system with axially displaceable cam holders so that a change can be made to a differently shaped cam contour by displacement of the cam holder. As a result of this, for example, the duration and intensity of the valve actuation can be changed. On the other hand, it is known from EP 1 696 107 A1 to configure a cam to be rotatable by virtue of the fact that the cam is fitted rotatably on a support shaft and is connected via a pin to an inner shaft which can be rotated relative to the support shaft. The angular position and thus the time of shifting for the cylinder valve can thus be changed.

SUMMARY

Described herein is an adjustable camshaft by which both the time of shifting of the cylinder valves, as well as the duration and the intensity of the valve actuation, can be varied in order to achieve even better adjustment to the current operating condition of the internal combustion engine, and thus increase the efficiency of the internal combustion engine. An embodiment of the camshaft includes a support shaft formed as a hollow shaft, in the interior of which an inner shaft is concentrically disposed. The inner shaft is rotatable relative to the support shaft. Moreover, a first cam segment is disposed on the support shaft and includes a first recess defined therein for receiving the support shaft. The cam segment is rotatable with respect to the support shaft and is connected in a rotationally coupled manner to the inner shaft via a first opening in the support shaft. The first cam segment has at least two cam contours. The connection between the inner shaft and the first cam segment is furthermore configured such that the first cam segment is axially displaceable relative to the inner shaft and to the support shaft. This structure ensures that a change can be made simultaneously between two cam contours and moreover the angular position of the cam contours can be set flexibly.

BRIEF DESCRIPTION OF THE DRAWINGS

The present disclosure is described in detail below with reference to the attached drawing figures, wherein.

DETAILED DESCRIPTION

Figure 1:
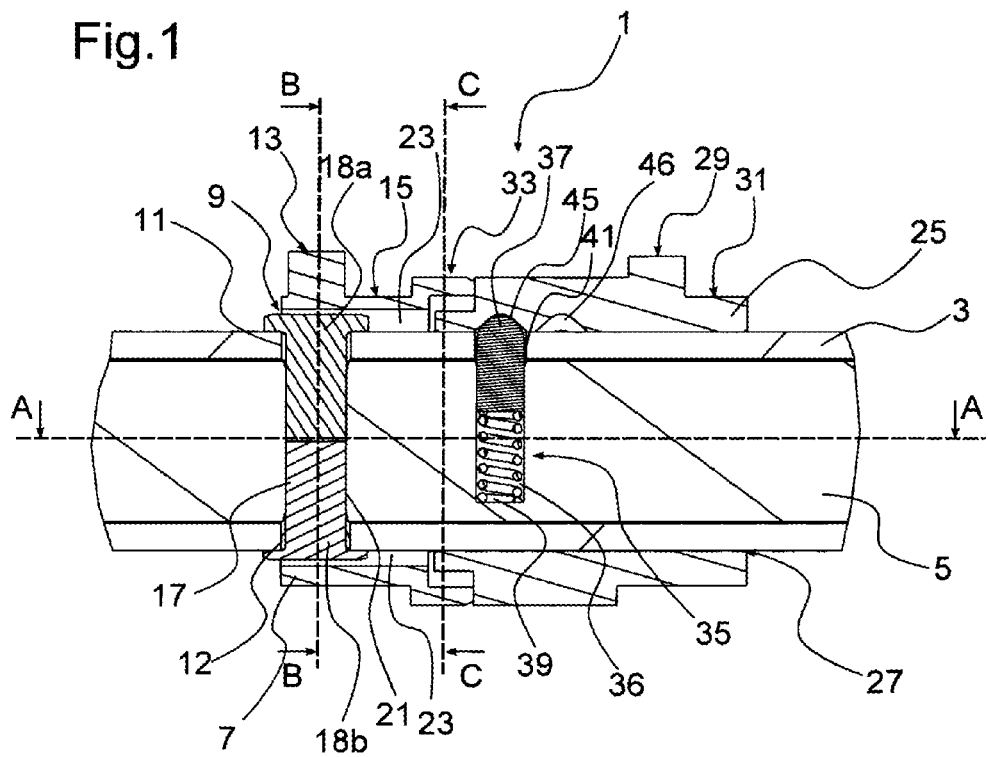
FIG. 1 is a partial side longitudinal cross-section view of a section of a first embodiment of a camshaft of the present disclosure, taken about section line D-D of FIG. 5.

An embodiment of a camshaft of the present disclosure includes a support shaft formed as a hollow shaft, in the interior of which an inner shaft is concentrically disposed. The inner shaft is rotatable relative to the support shaft. Moreover, a first cam segment is disposed on the support shaft and includes a first recess defined therein for receiving the support shaft. The cam segment is rotatable with respect to the support shaft and is connected in a rotationally coupled manner to the inner shaft via a first opening in the support shaft. Here, the first cam segment has at least two cam contours. The connection between the inner shaft and the first cam segment is furthermore configured such that the first cam segment is axially displaceable relative to the inner shaft and to the support shaft. This structure ensures that a change can be made simultaneously between two cam contours and moreover the angular position of the cam contours can be set flexibly.

In particular, for this purpose, the inner shaft has a bore with a pin which reaches through the first opening in the support shaft and engages in an axial groove in the inner side of the first recess of the first cam segment. The first cam segment is accordingly displaceable in the axial direction, whereas a positive locking is present between the pin and the groove in the circumferential direction and thus prevents a rotation of the first cam segment relative to the inner shaft. In this manner, on one hand, simple coupling between inner shaft and the first cam element can be achieved, while on the other hand displaceability relative to the inner shaft and to the support shaft is ensured.

The term axial direction refers within the meaning of this application to a direction which runs parallel to the axis of rotation of the camshaft. The circumferential direction runs perpendicular to the axis of rotation along a circumference of the camshaft.

In the case of a further developed embodiment of the camshaft, the inner shaft has a continuous bore with a pin which reaches through the first opening and a second opening in the support shaft, wherein the second opening is opposite the first opening, and wherein the pin engages with its opposite ends in two axial grooves in the inner side of the first recess of the first cam segment. This symmetrical variant with two opposite openings and axial grooves enables greater stability of the connection between inner shaft and first cam segment so that a higher torque can be transmitted via the cam contours.

The extent of the first opening in the circumferential direction is typically larger than the diameter of the pin. In this manner, the rotation of the inner shaft in relation to the support shaft is not entirely prevented by the pin. On the other hand, it may be advantageous in some variants to select the extent of the first opening in the circumferential direction so that the opposite ends in the circumferential direction of the first opening act as end stops for the pin which fix the angle of rotation of inner shaft in relation to the support shaft. A clearly defined angular range is thus specified for the setting of the angular position. Alternatively, the angular range can naturally also be specified by the control unit for rotation of the inner shaft. In this case, a small degree of play in the circumferential direction between the pin and the first opening also remains in the end positions.

In order to ensure a well-defined displacement of the first cam segment relative to the inner shaft and to the support shaft, the axial groove on the inner side of the recess is guided during displacement via the pin. The pin slides along the axial groove. In some embodiments, the axial groove is arranged on the inner side of the recess in the circumferential direction where the maximum of one of the cam contours also lies on the outer side. This has the advantage that the material thickness is greater here so that it is easier to provide an axial groove and nevertheless a stable cam. In principle, the axial groove nevertheless does not have to coincide in the circumferential direction with the maximum, rather can also be arranged at any desired other position.

In the case of one further developed embodiment, adjacent to the first cam segment, a second cam segment with a second recess for receiving the support shaft is arranged on the support shaft, wherein the second cam segment has at least two cam contours and wherein the connection between the second cam segment and the support shaft is configured such that the second cam segment is arranged in a rotationally conjoint manner and axially displaceably on the support shaft.

The arrangement of a second adjacent cam segment makes it possible to control two valves of the same cylinder with the same camshaft. Alternatively, two valves of two adjacent cylinders can also be controlled with such an arrangement. Due to the fact that the second cam segment is also arranged displaceably on the support shaft in the axial direction and has at least two cam contours, a change can be performed with both cam segments between the respective cam contours for actuation. As a result of this, high flexibility in the actuation of the cylinder valves is achieved.

The cam contours of the first cam segment typically differ from one another. The cam contours of the second cam segment also differ from one another. High variability is ensured as a result of this.

It may, however, also be advantageous if two cam contours of the first cam segment are identical or two cam contours of the second cam segment are identical. For example, in many of the following configurations of the camshaft, the first and the second cam segment are only jointly displaceable in the axial direction. In particular in such cases, it may be advantageous if two cam contours of the second cam segment are identical while the corresponding cam contours of the first cam segment are different (or vice versa). There are thus applications in which a change should only be made with the first cam segment to a different cam contour and the cam contour of the second cam segment should be retained. Since both cam segments are only jointly displaceable, in such a case two different cam contours are provided on the first cam segment and two identical cam contours on the second cam segment. If both identical cam contours are arranged adjacently on the second cam segment, the corresponding region of the second cam segment is advantageously embodied in the form of a wide cam. This means that the cross-section of the cam segment does not change between the two identical cam contours.

In one variant of the camshaft, the second recess of the second cam segment and the outer side of the support shaft have opposing indentations so that cavities are produced in which bearing bodies are arranged. As a result of this, the rotationally conjoint nature of the second cam segment in relation to the support shaft is ensured. At the same time, in contrast to a toothing, no axial region of the support shaft with an increased diameter occurs. The support shaft can therefore also be pushed into closed bearing receivers without any problems. In order to enable an axial displacement of the second cam segment on the support shaft, in this case the indentations on the inner side of the second recess or the indentations on the outer side of the support shaft have a greater extent in the axial direction than the bearing bodies. The bearing bodies slide off in these indentations during displacement of the second cam segment. The rotationally conjoint nature is supported in that the indentations on the inner side of the second recess and the indentations on the outer side of the support shaft have an extent in the circumferential direction which corresponds substantially to the extent of the bearing bodies in this direction in order to prevent a rotation of the second cam segment relative to the support shaft.

In one alternative variant, toothings which engage in one another are arranged on the inner side of the second recess and on the outer side of the support shaft. The tooth grooves of the toothing extend in the axial direction so that an axial displacement of the second cam segment on the support shaft is enabled and a rotation of the second cam element relative to the support shaft is prevented. A toothing can be produced with relative ease and requires no additional insertion of bearing bodies. For example, the toothing on the outer side of the support shaft can be embodied in the form of a pressed-on tooth ring.

In the case of a further developed embodiment variant of the camshaft according to the invention, the first cam segment and the second cam segment are arranged adjacently on the support shaft. Moreover, a coupling is established between the first cam segment and the second cam segment such that the first cam segment is rotatable relative to the second cam segment and both cam segments are only jointly displaceable in the axial direction. This has the advantage that both cam segments can be displaced in the axial direction with only one control device (for example, a slide track)

One possible form for realizing such a coupling is a bayonet joint between the two cam segments. The first cam segment has, on the end side facing the second cam segment, a first collar which extends along a part of the circumference. At the same time, the second cam segment has, on the end side facing the first cam segment, a second collar which also extends along a part of the circumference. The coupling is formed in that the first collar and the second collar are in engagement with one another. For coupling of the two cam segments, these are initially arranged so that their recesses are aligned with one another. In this case, the angular orientation of the cam segments is selected relative to one another so that the first collar of the first cam segment comes to lie in the regions in which the second cam segment does not have a collar. The extent of the first collar in the circumferential direction must therefore be smaller than the extent of the regions of the second cam segment in which no second collar is arranged. The corresponding applies in reverse. The two cam segments can then be pushed together in the axial direction. A positive locking of the first collar with the second collar is produced thereafter by a rotation of both cam segments in relation to one another, wherein the first collar and the second collar are in engagement with one another and in this manner form the coupling.

In a further embodiment, the first cam segment and the second cam segment are arranged adjacently on the support shaft. Both cam segments have a joint contact surface which runs perpendicular to the axis of rotation of the support shaft so that the first cam segment is rotatable relative to the second cam segment without a displacement of one of the two cam segments being brought about during rotation. In this manner, rotation and axial displacement are independent of one another and can be carried out separately.

In one variant of the invention, the first cam segment is tensioned by a spring element against the second cam segment. In one alternative variant, the second cam segment is tensioned by a spring element against the first cam segment. This means that the tensioned cam segment is pushed by the spring element continuously against the other respective cam segment. In the case of an axial displacement of the untensioned cam segment, the tensioned cam segment automatically follows the movement of the untensioned cam segment. This has the advantage that no latching means have to be arranged on the tensioned cam segment. It is sufficient to fix the untensioned cam segment with a latching means. The tensioned cam segment is then also fixed in its axial position by the latching means of the untensioned cam segment and by the spring force. A coupling of the two cam segments can therefore be dispensed with.

One embodiment variant of the camshaft according to the invention is configured such that the first cam segment and the second cam segment together have at least one first slide track for movement of the first cam segment and of the second cam segment in a first axial direction and a second slide track for movement of the first cam segment and of the second cam segment in a second axial direction. The second axial direction is opposite to the first axial direction here.

Slide tracks are easy to produce means in order to bring about the displacement of elements on rotating shafts. The existing rotational movement of the shaft is used by virtue of the fact that a stationary means, such as, for example, a driver pin, is brought into contact with the slide track of the element. The slide track runs at least in part obliquely in relation to the circumferential direction (i.e. neither along the circumferential direction nor along the axial direction). In the case of rotation of the shaft, the slide track slides along the pin. Since the pin is stationary, a force is exerted on the slide track by the rotation, which force has force components in the axial direction and in the circumferential direction. A movement of the slide track in the circumferential direction (i.e. a rotation of the slide track) is normally ruled out by virtue of the fact that the element is attached in a rotationally conjoint manner on the shaft. A force component in the axial direction, which leads to a displacement of the slide track and thus to a displacement of the element, thus remains.

It is particularly advantageous to arrange the first and the second slide track on the second cam segment. As a result of this, it is brought about that the first cam segment can be configured to be narrower since no axial region must be provided for the slide track. This in turn brings with it a weight advantage for the first cam segment. Since the first cam segment is rotated by means of the inner shaft, it is advantageous if this cam segment is particularly lightweight. The additional weight for the region with the slide track strikes against the second cam segment to a lesser extent since the second cam segment is only displaced but not rotated.

It may nevertheless of course be advantageous in some embodiments to arrange both slide tracks on the first cam segment.

Particularly in the case of embodiments without a coupling between the first cam segment and the second cam segment, the joint movement of both cam segments can be realized in that the first cam segment has a first slide track for movement of the first cam segment in a first axial direction towards the second cam segment and the second cam segment has a second slide track for movement of the second cam segment in a second axial direction towards the first cam segment.

Slide tracks can be formed in two different manners. On one hand, it is possible to form the slide track in a groove-like manner. A fixed pin can then be introduced into the groove-shaped slide track for displacement of the element. The slide track runs at least in part obliquely in relation to the circumferential direction (i.e. neither along the circumferential direction nor in the axial direction). A helical profile with a constant gradient of the helical path or a helical profile with varying gradient is possible, for example. Further complex profiles are also possible.

On the other hand, an end side of the element to be displaced can also be provided at least in part with an oblique profile to the axial direction. Since the first cam segment and the second cam segment are adjacent in many variants, only the end side which faces away from the other respective cam segment is possible for this configuration of the slide track.

It is thus possible to form both the first slide track and the second slide track in a groove-shaped manner or to form the first slide track and the second slide track in the form of an end side of a cam segment which runs obliquely at least in part and facing away the other respective cam segment. Mixed forms are also possible in which one slide track is formed as an obliquely running groove and the other slide track as an end side running obliquely in part.

In the case of embodiments in which only the first cam segment is displaceable, both end sides of the first cam segment can also be provided with a profile which is oblique in part. This enables a particularly narrow embodiment of the first cam segment, as a result of which the first cam segment has a low mass. As a result of this, the rotation of the first cam segment is facilitated. A narrow design additionally has the advantage that mounting is facilitated since typically only a small installation space is available for this.

In some embodiments according to the invention of the camshaft, each cam contour of the first cam segment is assigned an associated cam contour of the second cam segment and an associated joint axial position of first cam segment and second cam segment. As a result of this assignment, it is achieved that a cam contour of the first cam segment is active precisely when the assigned cam contour of the second cam segment is also active. Whereby this is precisely the case when the assigned joint axial position is occupied. A cam contour is referred to as active when it is located at the correct axial position in order to actuate a cylinder valve during operation of the camshaft. By displacing the assembly of first and second cam segment from a first joint axial position to a second joint axial position, a change can thus be made from a first operating mode into a second operating mode. In the first operating mode, a first cam contour of the first cam segment and a first cam contour of the second cam segment are active. By displacement to the second joint axial position, a second cam contour of the first cam segment moves to the original axial position of the first cam contour. The second cam contour is thus now active and the first cam contour of the first cam segment is inactive. At the same time, a second cam contour of the second cam segment moves to the original axial position of the first cam contour of the second cam segment. The second cam contour of the second cam segment is thus also active. The camshaft is now located in the second operating mode in which the second cam contour of the first cam segment and the second cam contour of the second cam segment are active.

It is advantageous if the camshaft comprises a latching means which latches the respective cam segment at one of the joint axial positions. This ensures a stable operating condition in which no unintentional displacements of the cam segments occur.

In the case of embodiments with a coupling between the first and the second cam segment, it is sufficient to fix one of the two cam segments with a latching means. The other cam segment is then also automatically fixed via the coupling.

In the case of the embodiment variants without a coupling, it is, however, advantageous to provide both a latching means for latching the first cam segment and a latching means for latching the second cam segment. In this manner, each of the two cam segments is latched independently.

One possibility for embodying the latching means lies in providing a bore in the inner shaft with a spring-loaded latching body which is movably mounted in the radial direction. The latching body reaches through a latching opening in the support shaft and engages in a latching groove in the inner side of the recess of the respective cam segment. Since the inner shaft is rotatable within the support shaft, it is necessary that the latching opening in the support shaft and the latching groove have in each case an extent in the circumferential direction which is greater than the extent of the latching body in the circumferential direction. In this manner, a rotation of the inner shaft relative to the support shaft is not prevented by the latching body.

During displacement of the cam segment, the latching body is displaced counter to the spring force in support shaft and inner shaft until no positive locking is present any longer in the axial direction between latching body and latching groove. As soon as the second joint axial position is reached, the spring pushes the latching body into the corresponding latching groove, as a result of which the cam segment is latched at this axial position.

One possible variant for a cam contour of the first or second cam segment is a zero stroke. This means that the cam contour is shaped so that no actuation of the corresponding cylinder valve occurs. In such a case, typically both a cam contour of the first cam segment and the corresponding assigned cam contour of the second cam segment are embodied as a zero stroke. Since the first cam segment frequently serves to actuate and the second cam segment serves to actuate second valves of the same cylinder, this configuration has the advantage that the cylinder is switched off by virtue of the fact that none of the two valves are actuated any more. In the case of a four-cylinder motor, it may be advantageous, for example, in specific operating states to switch off two of the cylinders and operate the motor as a two-cylinder motor. If such a motor is fitted with a camshaft according to the invention, in which each of the four cylinders is assigned an assembly of first cam segment and second cam segment, two cylinders can, for example, be switched off. At the same time, the actuation of the remaining cylinders can be adapted by rotation of the inner shaft in relation to the support shaft or by changing to a different active cam contour in order to improve the efficiency of the two active cylinders. In this manner, fuel consumption can be reduced by switching off two cylinders.

The present disclosure will be described in greater detail below with reference to the attached drawing figures.

Figure 2:
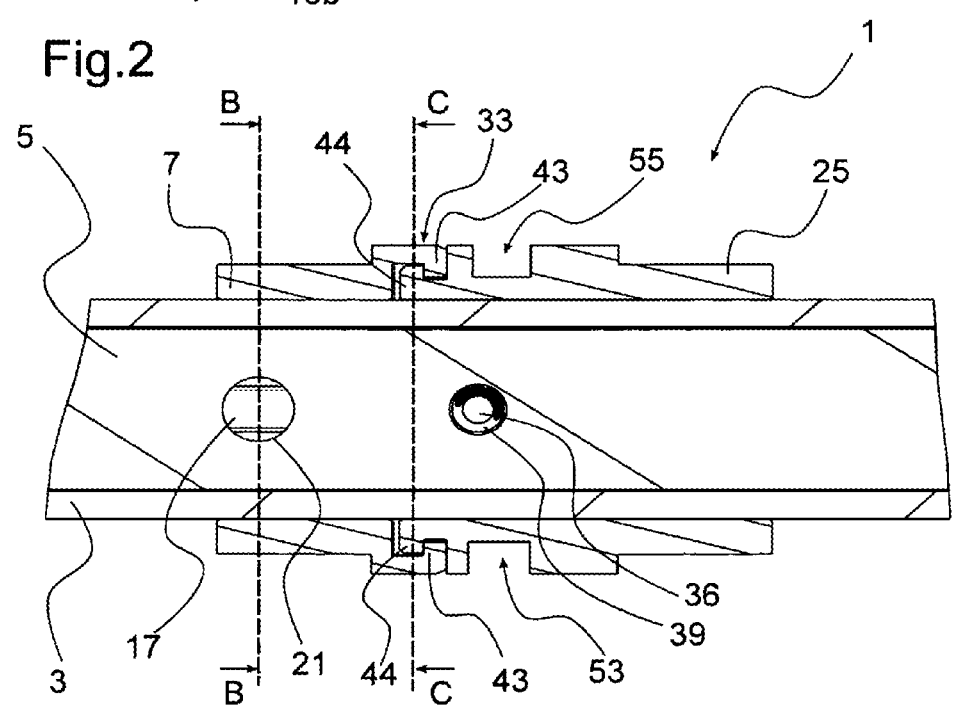
FIG. 2 is a partial top longitudinal cross-section detail view of a section of the first embodiment of a camshaft of the present disclosure, taken about section line E-E of FIG. 5.
Figure 3:
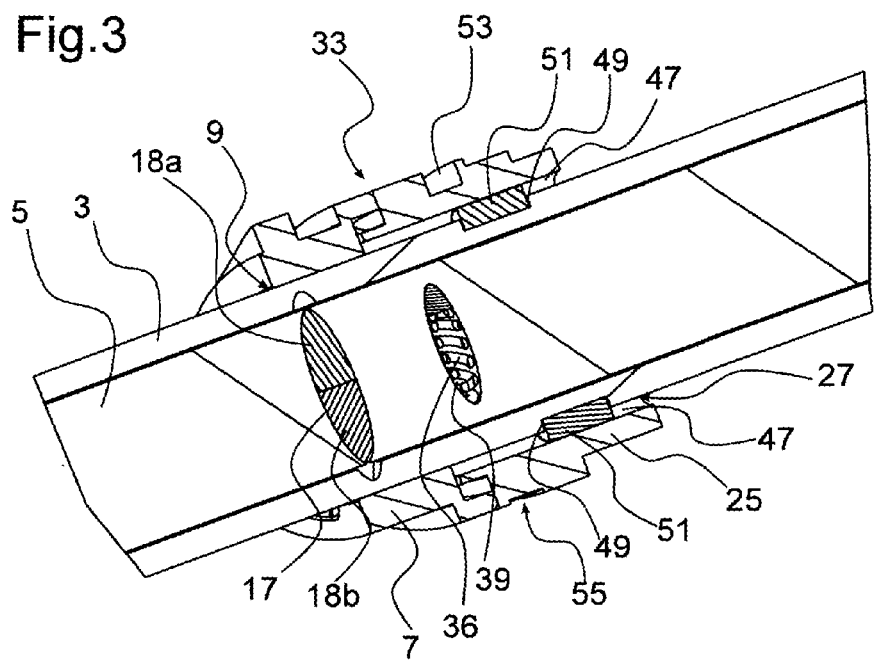
FIG. 3 is a partial isometric cross-section view of a section of the first embodiment of a camshaft of the present disclosure, taken about section line F-F of FIG. 5.
Figure 4:
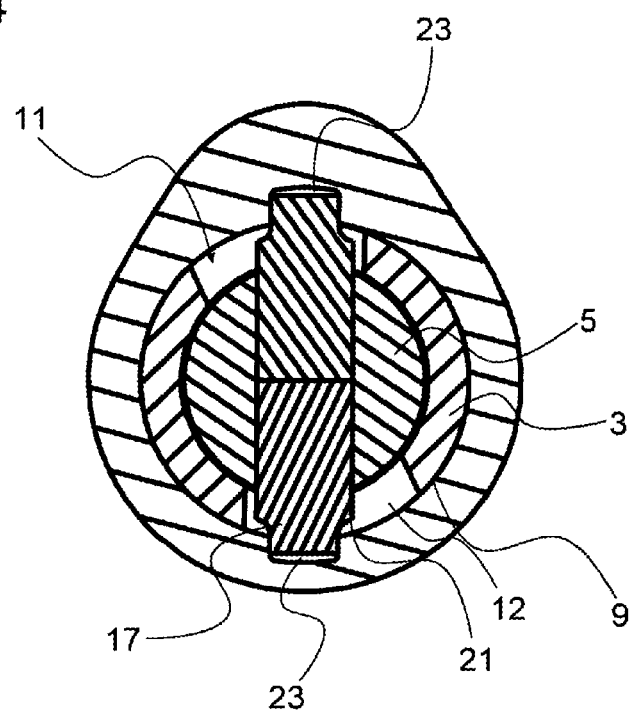
FIG. 4 is a front plan cross-section view of a the first embodiment of a camshaft of the present disclosure, taken about section line B-B of FIG. 1.
Figure 5:
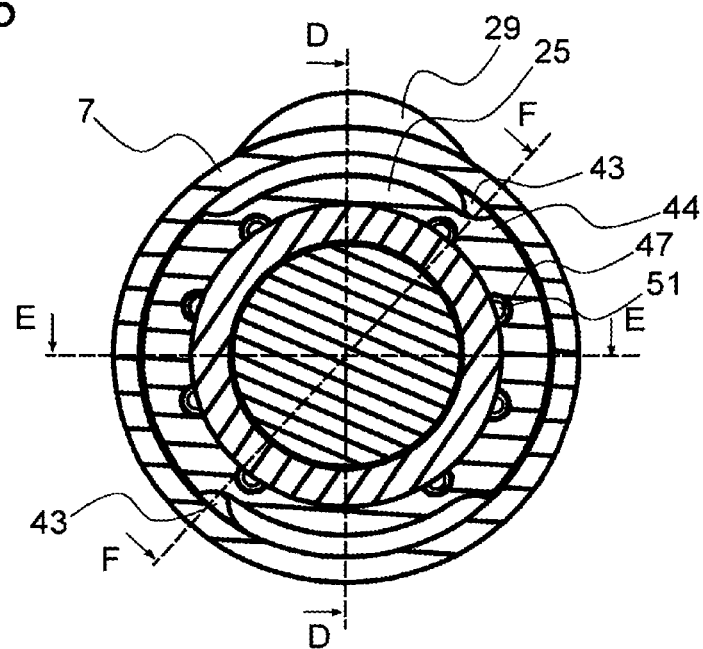
FIG. 5 is a back plan cross-section view of a the first embodiment of a camshaft of the present disclosure, taken about section line C-C of FIG. 1.

The sectional planes shown in FIGS. 1 to 3 contain in each case the axis of rotation of the camshaft, whereas the sectional planes of FIGS. 4 to 5 are perpendicular to the axis of rotation. FIGS. 1-10 show a first embodiment of the camshaft according to the invention. In each case one section through the camshaft is shown in FIGS. 1 to 3, wherein the sectional plane in all three cases contains the axis of rotation of the camshaft. FIGS. 4 and 5 show two sections through the camshaft which run perpendicular to the axis of rotation of the camshaft.

A longitudinal section of camshaft 1 is represented in FIG. 1. Camshaft 1 comprises a support shaft 3, which is formed as a hollow shaft, and an inner shaft 5 which is arranged concentrically in relation to support shaft 3. Inner shaft 5 is rotatable relative to support shaft 3. A first cam segment 7 with a first recess 9 for receiving support shaft 3 is arranged on support shaft 3. Support shaft 3 has a first opening 11 via which first cam segment 7 is connected to inner shaft 5 in a rotationally conjoint manner. First cam segment 7 is, however, rotatable with respect to support shaft 3. First cam segment 7 has a first cam contour 13 and a second cam contour 15 which are offset to one another in the axial direction. In the case of the configuration of camshaft 1 represented in FIG. 1, first cam segment 7 is located at an axial position so that first cam contour 13 is active. This means that a cylinder valve is actuated in the installed state of camshaft 1 into an internal combustion engine with cam contour 13. Cam contour 15 is, in contrast, not active. This means that cam contour 15 is not located at the correct axial position in order to be able to actuate a cylinder valve. According to the invention, first cam segment 7 is displaceable relative to inner shaft 5 and to support shaft 3. First cam segment 7 can therefore be displaced to the left (in this representation) so that second cam contour 15 moves to the axial position of first cam contour 13. In this case, second cam contour 15 would be active since it is located at the correct axial position in order to bring about an actuation of a cylinder valve. In the case of the represented embodiment, the second cam contour is, however, embodied as a zero stroke so that even if second cam contour 15 is active, no cylinder actuation is carried out. It is thus brought about by displacement of first cam segment 7 that the assigned cylinder valve is no longer actuated. A cylinder switch-off is carried out. Instead of a cylinder switch-off, a change can alternatively also be made into a different actuation mode by displacement of first cam segment 7. In such a case, both first cam contour 13 and second cam contour 15 are embodied so that they actuate the cylinder valve in the respective active position. Both cam contours 13 and 15 differ, for example, in the stroke height so that the cylinder valve is actuated to a different extent depending on the position of first cam segment 7, or in the angular position so that, depending on the position of first cam segment 7, the cylinder valve is actuated at different points in time. It is also possible that the cam contours have a different width so that the activation period of the cylinder valve is different.

In addition to the displacement of first cam segment 7, first cam segment 7 can also be changed in its angular position in relation to support shaft 3. To this end, first cam segment 7 is arranged rotatably on support shaft 3 and is connected in a rotationally conjoint manner to inner shaft 5 via first opening 11 by means of pin 17. During rotation of inner shaft 7 relative to support shaft 3, first cam segment 7 is thus also rotated with respect to support shaft 3. So that pin 17 does not prevent the rotation of inner shaft 5 in relation to support shaft 3, first opening 11 is larger in the circumferential direction than the diameter of pin 17. Inner shaft 5 has a bore 21 for receiving pin 17. Pin 17 reaches through opening 11 in support shaft 3 and engages in an axial groove 23 in the inner side of first recess 9 of first cam segment 7. In the present case, pin 17 is in two pieces and comprises a first pin part 18a and a second pin part 18b. A one-piece embodiment of pin 17 is alternatively also possible.

In the case of the represented embodiment, bore 21 is embodied as a continuous bore and pin 17 reaches through first opening 11 and second opening 12 which is opposite first opening 11, wherein pin 17 engages with its opposite ends in two axial grooves 23 in the inner sides of recess 9 of first cam segment 7. Instead of such a symmetrical embodiment, it is also possible to form bore 21 in the form of a blind hole so that only one side of pin 17 reaches through a first opening 11 in support shaft 3 and engages in an axial groove 23.

A second cam segment 25 is arranged on support shaft 3 adjacent to first cam segment 7. Second cam segment 25 has a first recess 27 for receiving support shaft 3, a first cam contour 29 and a second cam contour 31. Second cam contour thus has the same number of cam contours as first cam segment 7.

Second cam segment 25 is connected to support shaft 3 such that it, on one hand, is arranged in a rotationally conjoint manner in relation to support shaft 3, but on the other hand axially displaceably on support shaft 3. One example of a mechanical configuration is explained with reference to FIG. 3.

A coupling 33 is established between first cam segment 7 and second cam segment 25 such that first cam segment 7 is rotatable relative to second cam segment 25 and both cam segments 7 and 25 are only jointly movable in the axial direction. The mechanical configuration of coupling 33 is explained further below in conjunction with FIG. 5.

In the present case, each cam contour of first cam segment 7 is assigned a cam contour of second cam segment 25 and an associated joint axial position of first cam segment 7 and second cam segment 25. In the case of the represented operating mode of camshaft 1, for example, first cam contour 13 of first cam segment 7 is active since it is located at an axial position in the case of which it, in the installed state of the camshaft, actuates a cylinder valve. At the same time, first cam contour 29 of second cam segment 25 is also active. An assignment between first cam contour of first cam segment 7 and first cam contour 29 of second cam segment 25 is thus provided. If first cam segment 7 is now moved jointly with second cam segment 25 in the axial direction until second cam contour 15 of first cam segment 7 assumes the original axial position of first cam contour 13 (i.e. to the left), second cam contour 15 of cam segment 7 is active. Second cam contour 31 of second cam segment 25 is correspondingly also displaced to the original position of first cam contour 29 of second cam segment 25 so that second cam contour 31 is now also active. A second operating mode is therefore set. Each of these operating modes includes an associated joint axial position of first cam segment 7 and second cam segment 25. In the first operating mode (represented), cam contours 13 and 29 are active while first cam segment 7 and second cam segment 25 are located at the shown joint axial position. In the second operating mode (not represented), first cam segment 7 and second cam segment 25 are located at a joint axial position further to the left so that cam contours 15 and 31 assume the original axial positions of cam contours 13 and 29 and are thus active. In order to fix the unit of first cam segment 7 and second cam segment 25 at the corresponding joint axial position, a latching means 35 is provided which latches second cam segment 25 at one of the joint axial positions. Since first cam segment 7 is connected to second cam segment 25 via coupling 33, the axial position of first cam segment 7 is thus also specified. A joint axial position is therefore fixed. Latching means 35 comprises a bore 36 in inner shaft 5 with a spring-loaded latching body 37. Latching body 37 is mounted movably in the radial direction. This radial movement of latching body 37 is carried out under compression of spring 39. Spring-loaded latching body 37 reaches through a latching opening 41 in support shaft 3 and engages in a latching groove 45 in the inner side of second recess 27 of second cam segment 25. If first cam segment 7 and second cam segment 25 are displaced towards the second operating mode (i.e. to the left), spring 39 is initially compressed in order to enable the displacement. At the assigned joint axial position, spring 39 then brings latching body 37 into engagement with other latching groove 46 and thus fixes the joint axial position. Both latching opening 41 and both latching grooves 45 and 46 have in each case an extent in the circumferential direction which is greater than the extent of latching body 37 in the circumferential direction so that latching body 37 does not hinder a rotation of inner shaft 5 relative to support shaft 3. Latching grooves 45 and 46 can also be embodied to be fully circumferential. This then enables a simpler production method. Bore 36 for latching body 37 runs in the case of this embodiment parallel to bore 21 for pin 17. This has the advantage that both bores 21 and 36 can be carried out without rotating the inner shaft between the boring steps. The diameter of both bores 21 and 36 does not of course have to be identical. In principle, however, any desired angle between the two bores is possible. Moreover, both bores 21 and 36 and thus pin 17 or the direction of movement of latching body 37 do not necessarily have to run radially. An oblique profile with components in the axial direction and radial direction is also possible.

FIG. 2 shows a longitudinal section through camshaft 1 according to the invention which runs perpendicular to the longitudinal section according to FIG. 1. The longitudinal section contains line A-A which is represented in FIG. 1 and coincides with the axis of rotation of the camshaft. Bores 21 and 36 are clearly apparent in inner shaft 5. Pin 17 is received in bore 21 and in bore 36 spring 39 which is part of latching means 35. First cam segment 7 and second cam segment 25 are arranged on support shaft 3. While first cam segment 7 is rotatable with respect to support shaft 3, second cam segment 25 is rotationally conjoint in relation to support shaft 3. A coupling 33 is established between first cam segment 7 and second cam segment 25 such that first cam segment 7 is rotatable relative to second cam segment 25 and both cam segments 7 and 25 are only jointly movable in the axial direction. First cam segment has, on the end side facing second cam segment 25, a first collar 43 and second cam segment 25 has, on the end side facing first cam segment 7, a second collar 44. First collar 43 and second collar 44 are in engagement with one another and thus form coupling 33. In the variant represented, first cam segment 7 engages around second cam segment 25, while the second cam segment lies closer to support shaft 5 on the end side. The reverse case is naturally also possible in which second cam segment 25 engages around first cam segment (cf. FIG. 11).

The joint movement of first cam segment 7 and of second cam segment 25 is brought about with the help of a first slide track 53 and of a second slide track 55. The mode of operation of slide tracks 53 and 55 is explained in greater detail below with reference to FIG. 6.

FIG. 3 shows a perspective representation through a cut-open camshaft 1. The sectional plane also contains the axis of rotation and is at an angle of approximately 30° to the sectional plane represented in FIG. 1. The profile of the various sectional planes is once again explained in FIG. 5. In addition to the components already explained, FIG. 3 shows that two indentations 47 are arranged on the inner side of second recess 27 of second cam segment 25. An indentation 49 is respectively arranged on the outer shaft of the support shaft opposite indentations 47 so that cavities are respectively produced in which bearing bodies 51 are arranged. While indentations 49 have approximately the same extent in the axial direction as bearing bodies 51, indentations 47 have a greater extent on the inner side of second recess 27 in the axial direction than bearing bodies 51. In the present case, indentations 47 even extend across the complete axial extent of second cam segment 25. During displacement of second cam segment 25 on support shaft 3, second cam segment 25 slides off on bearing bodies 51. In the circumferential direction, indentations 47 have on the inner side of second recess 27 and indentations 49 on the outer side of the support shaft both have in contrast an extent which corresponds substantially to the extent of bearing bodies 51 in this direction. Bearing bodies 51 thus, by positive locking, prevent a rotation of second cam segment 25 relative to support shaft 3.

FIG. 4 shows a cross-section through camshaft 1, wherein the sectional plane runs perpendicular to the axis of rotation and contains line B-B which is represented in FIGS. 1 and 2. Support shaft 3, in the interior of which inner shaft 5 is arranged rotatably, is clearly apparent in FIG. 4. Inner shaft 5 has a continuous bore 21 with a pin 17. First cam segment 7 with a first recess 9 for receiving support shaft 3 is arranged on support shaft 3. A first opening 11 and a second opening 12 are fitted in support shaft 3. First cam segment 7 is connected in a rotationally conjoint manner to inner shaft 5 via first opening 11 and second opening 12. To this end, pin 17 reaches through first opening 11 and second opening 12 and engages with its opposing ends in two axial grooves 23 in the inner side of first recess 9 of first cam segment 7. The extents of first opening 11 and second opening are larger in the circumferential direction than the diameter of pin 17.

FIG. 5 shows a further cross-section though camshaft 1, wherein the sectional plane runs perpendicular to the axis of rotation and this time contains line C-C which is represented in FIGS. 1 and 2. The cross-section therefore runs through coupling 33. In order to further illustrate the relationship between the figures, FIG. 5 shows lines D-D, E-E and F-F. Line D-D indicates the position of the longitudinal section according to FIG. 1, line E-E the position of the longitudinal section according to FIG. 2 and line F-F the position of the longitudinal section according to FIG. 3.

The mode of operation of coupling 33 is now also clear from FIG. 5 which is formed in the form of a bayonet joint. First cam segment 7 has a collar 43 on the end side facing second cam segment 25. Said collar 43 extends only over a part of the circumference which leads to collar 43 not being seen in the longitudinal sections according to FIG. 1 and FIG. 3, rather only in FIG. 2. Second cam segment 25 has, at the end side facing first cam segment 7, a second collar 44 which also extends only over a part of the circumference, and therefore can also only be seen in the longitudinal section according to FIG. 2. The cross-section according to FIG. 5 runs through collar 44. In the regions of the circumference of second cam segment 25 in which no collar is arranged, FIG. 5 shows a part of collar 43 lying behind it. First cam segment 7 and second cam segment 25 are coupled to one another by virtue of the fact that both cam segments are initially arranged aligned with one another, wherein the angular orientation is selected so that first collar 43 of first cam segment 7 comes to lie in the regions in which second cam segment 25 does not have a collar. The extent of first collar 43 in the circumferential direction must therefore be smaller than the extent of the regions of second cam segment 25 in which no second collar is arranged. The corresponding applies in reverse. Both cam segments can then be pushed together in the axial direction. Thereafter, by rotation of both cam segments with respect to one another, a positive locking of first collar 43 with second collar 44 is produced, wherein first collar 43 and second collar 44 are in engagement with one another and in this manner form coupling 33.

FIG. 5 furthermore shows indentations 47 on the inner side of second recess 27 of second cam element 25. Since indentations 47 extend across the complete axial extent of the second cam element, the indentations are also apparent in the present section. Corresponding opposing indentations 49 in the outer side of support shaft 3 nevertheless do not extend up to the sectional plane shown in FIG. 5 and are therefore not visible in FIG. 5. Bearing bodies 51 are represented lying in indentations 49. In the present case, indentations 47 even extend across the complete axial extent of second cam segment 25. Eight bearing bodies 51 are arranged distributed over the circumference in corresponding cavities, formed by indentations 47 and 49. No indentations and bearing bodies are arranged on line D-D. As FIG. 1 shows, latching means 35 is arranged in this sectional plane so that no installation space is required any longer for the indentations. Of course, the latching means and the bearing bodies can also be arranged offset to one another in the axial direction so that latching means and bearing bodies can also be provided in the same longitudinal section.

Figure 6:
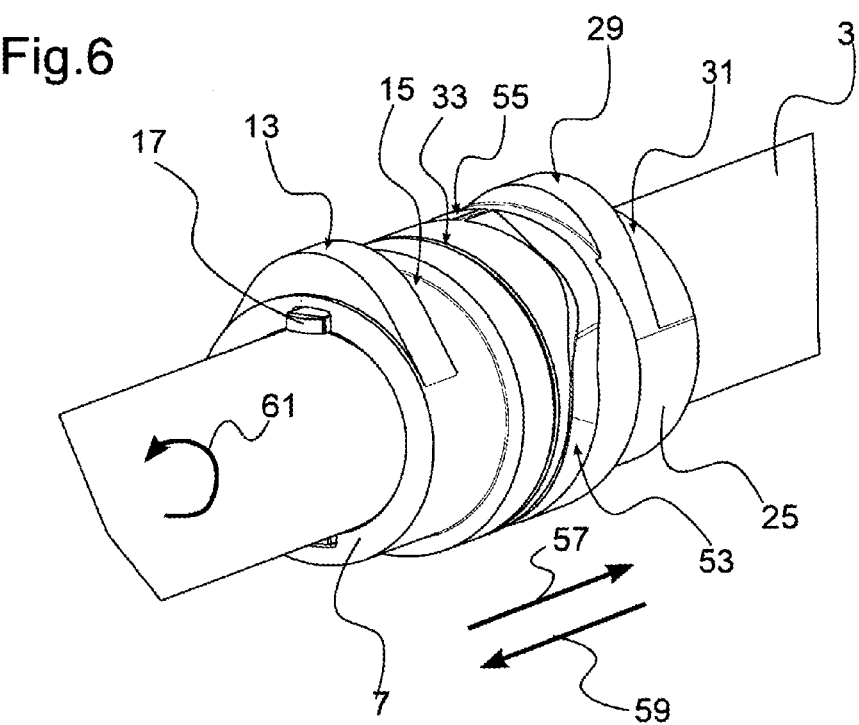
FIGS. 6 through 10 are isometric detail views of the first embodiment of a camshaft of the present disclosure.

FIG. 6 shows camshaft 1 according to the invention in a three-dimensional representation. First cam segment 7 is arranged on support shaft 3, which cam segment 7 is rotatable with respect to support shaft 3 and is connected in a rotationally conjoint manner to the inner shaft with the help of pin 17. First cam segment 7 has a first cam contour 13 and a second cam contour 15, wherein second cam contour 15 is embodied as a zero stroke. In the operating mode represented of camshaft 1, first cam contour 13 of first cam segment 7 is active since it is located at an axial position in which it actuates a cylinder valve in the installed state of camshaft 1. Second cam segment 25 is arranged adjacent to first cam segment 7 on support shaft 3. A coupling 33 is established between the two cam segments such that first cam segment 7 is rotatable relative to second cam segment 25 and both cam segments 7 and 25 are only jointly movable in the axial direction. Second cam segment 25 also has a first cam contour 29 and a second cam contour 31. First cam contour 29 is also active here. A first slide track 53 and a second slide track 55 are arranged on second cam segment 25 between coupling 33 and first cam contour 29. First slide track 53 serves to move first cam segment 7 and second cam segment 25 in a first axial direction 57 and the second slide track serves to move first cam segment 7 and second cam segment 25 in a second axial direction 59. The direction of rotation of camshaft 1 is referred to by 61 in FIG. 6. Cam contour 13 therefore moves away from the observer during rotation of camshaft 1. If a fixed pin in the upper region is introduced in the case of this direction of rotation into first slide track 53, the oblique profile of first slide track 53 leads to the second cam segment being moved in first axial direction 57 during a half turn of camshaft 1. Second slide track 55 also has an oblique profile, wherein the slide track has, however, an opposite angle to the circumferential direction. If one introduces the same fixed pin into second slide track 55 of second cam segment 25 (now displaced in first axial direction 57), second cam segment 25 is moved in second axial direction 59 during a half turn of camshaft 1. In principle, the profiles of first and second slide track 53 and 55 can be selected so that the movement of second cam segment 25 is carried out during any desired fraction of a turn. The change between two operating modes should be carried out between two consecutive actuations of a cylinder valve. The movement of second cam segment 25 should therefore be concluded at the latest after one turn. The embodiment according to the invention with a first slide track 53 and a second slide track 55, which each bring about a movement during half a turn, has the advantage that both slide tracks can be arranged at the same axial position on opposite sides of camshaft 1. This enables a very compact design of second cam segment 25. In the case of larger fractions of a turn, this is not possible since the slide tracks would then intersect one another. In this case, the slide tracks would have to be arranged offset to one another in the axial direction. On the other hand, smaller fractions of a turn have the disadvantage that the actuation of the fixed pin would have to be carried out more precisely the smaller the fraction. The movement during half a turn thus forms a good compromise.

Since first cam segment 7 and second cam segment 25, as a result of coupling 33, are only jointly movable in the axial direction, it is irrelevant whether first slide track 53 and second slide track 55 are arranged on first cam segment 7 or on cam segment 25. The shown arrangement on second cam segment 25 has the advantage that first cam segment 7 can be configured to be narrower since no axial region must be provided for the slide track. This in turn brings with it a weight advantage for first cam segment 7 which facilitates rotation of first cam segment 7.

Figure 6A:
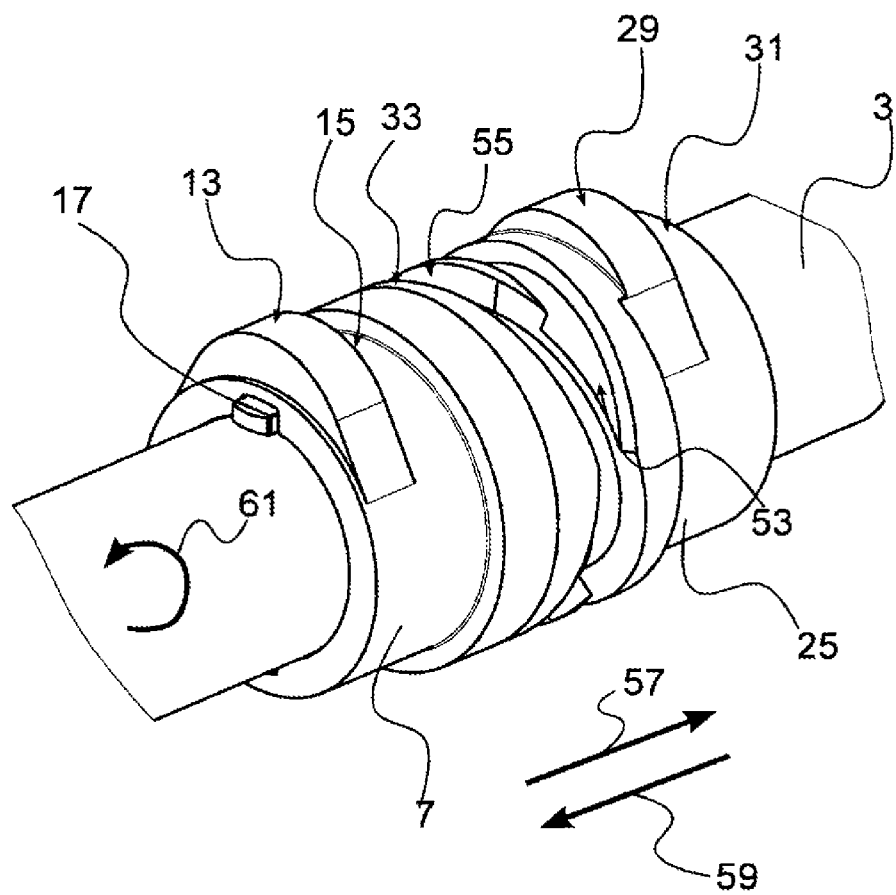

FIG. 6a shows a variant of camshaft 1 according to the invention. The represented variant of camshaft 1 differs from FIG. 6 only in the configuration of slide tracks 53 and 55. Slide tracks 53 and 55 bring about in each case a movement during a complete turn. In order to realize a compact design, the two slide tracks are embodied to be intersecting in this variant. The slide tracks can be realized, for example, as described in DE102007051739A1 or DE102010033087A1.

Figure 7:
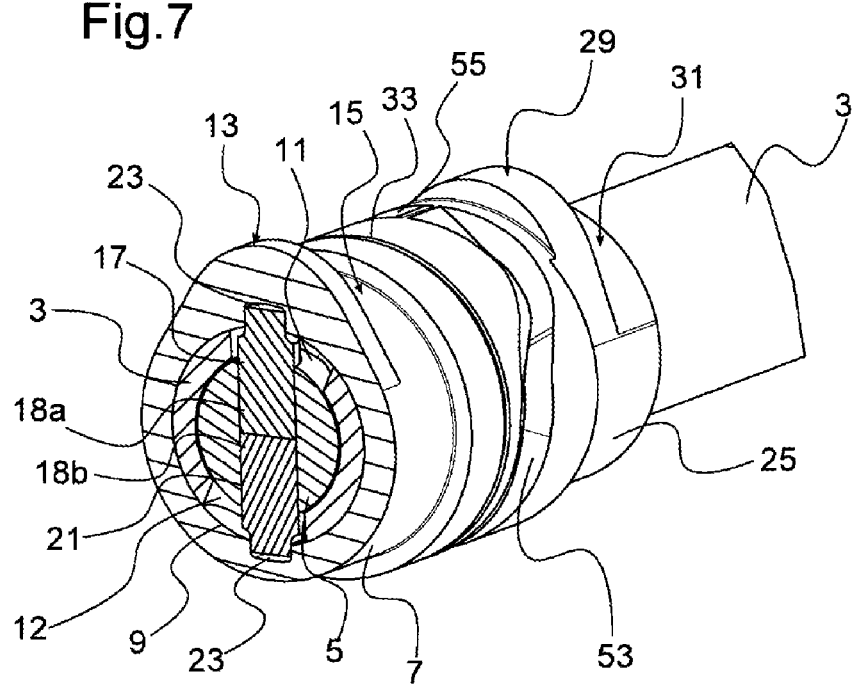

FIG. 7 shows a further three-dimensional representation of camshaft 1 according to the invention. In contrast to FIG. 6, in the case of this representation, camshaft 1 is cut open perpendicular to the axis of rotation. The sectional plane runs through first cam contour 13. Inner shaft 5 with bore 21 is clearly apparent in this representation. Pin 17 with first pin part 18a and second pin part 18b is arranged in bore 21. Pin 17 reaches through a first opening 11 and a second opening 12 in support shaft 3, wherein second opening 12 is opposite first opening 11. With its opposite ends, pin 17 engages in two axial grooves 23 in the inner side of first recess 9 of first cam segment 7.

Figure 8:
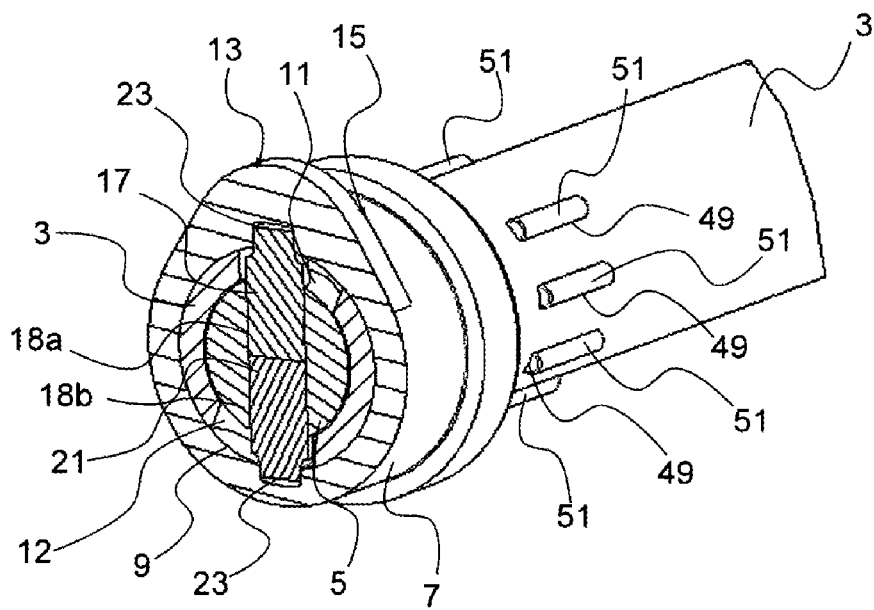

FIG. 8 shows a representation of camshaft 1 similar to FIG. 7. In this representation, second cam segment has been removed so that the view of bearing body 21 in indentations 49 is freed up.

Figure 9:
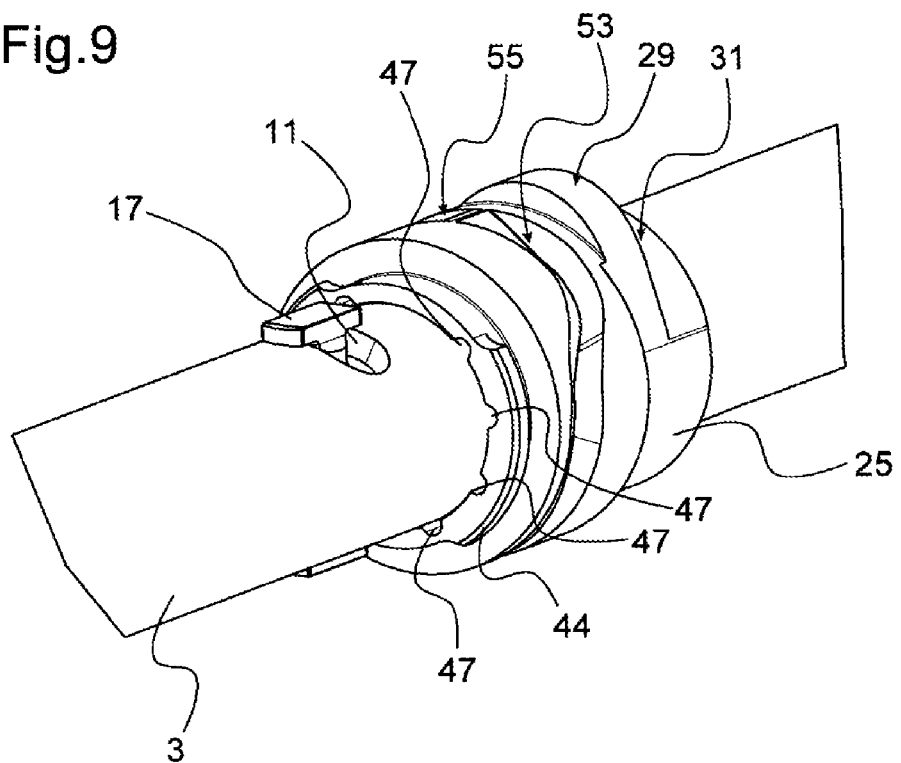

FIG. 9 shows a representation of camshaft 1 similar to FIG. 6. In this representation, first camshaft 7 has been removed so that the view of one end of pin 17, which reaches through first opening 11, is freed up. Second collar 44 of second cam segment 25 is now furthermore clearly apparent. Second collar 44 extends only over a part of the circumference and thus forms one part of a bayonet joint. Indentations 47 are furthermore apparent which extend over the complete axial extent of second cam segment 25. Bearing bodies (see FIG. 8) slide off in these indentations during displacement of second cam segment 25.

Figure 10:
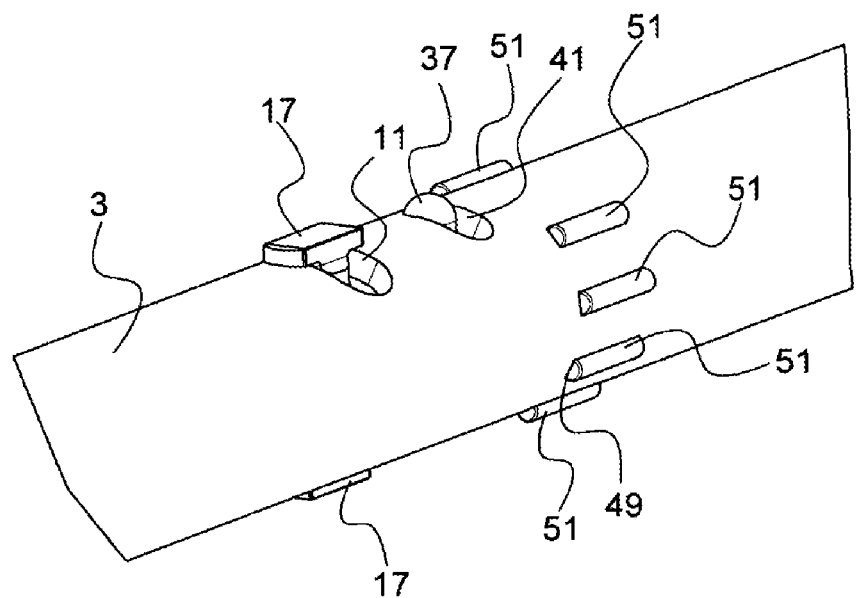

FIG. 10 shows a further three-dimensional representation of camshaft 1, wherein the first and the second cam element have now been removed in order to enable a view of latching body 37. Latching body 37 reaches through a latching opening 42 in support shaft 3. In the circumferential direction, latching opening 41 has an extent which is greater than the extent of latching body 37 in the circumferential direction so that latching body 37 does not hinder a rotation of inner shaft 5 relative to support shaft 3. The same applies to pin 17 and opening 11.

Figure 11:
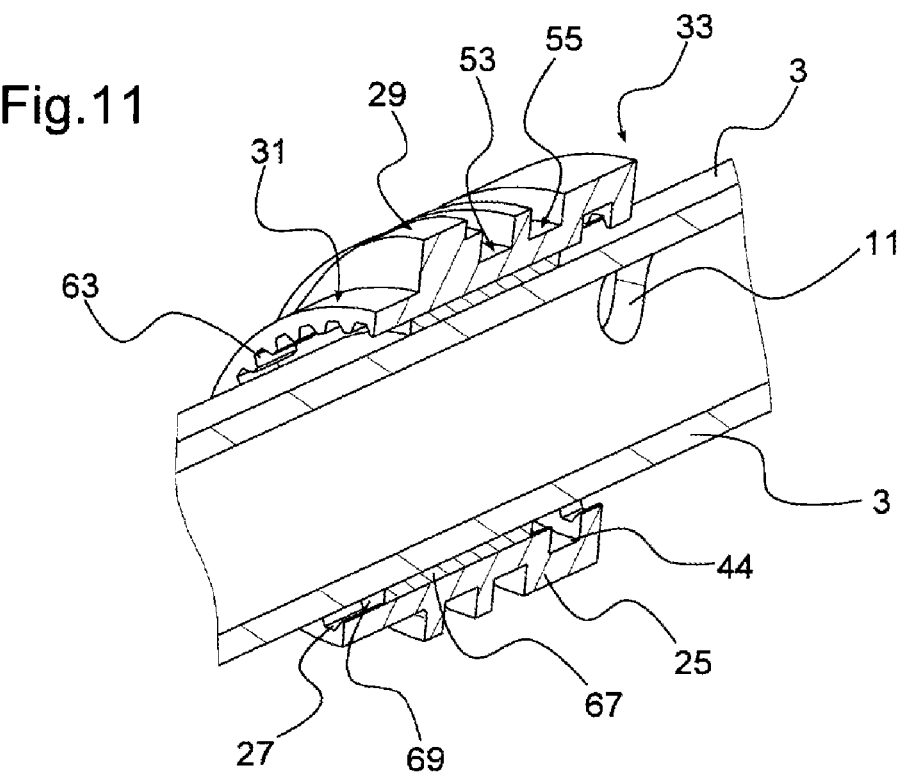
FIG. 11 is an isometric longitudinal cross-section view of a schematic representation of an embodiment of a camshaft of the present disclosure.

FIG. 11 shows by way of example construction variants which can be used in the described camshaft. A section through a support shaft 3 which has a second cam segment 25 is shown. Instead of the indentations with bearing bodies, in this variant, a toothing 63 is arranged on the inner side of second recess 27. The outer side of support shaft 3 furthermore has a toothing 69, wherein both toothings 63 and 69 engage in one another. The tooth grooves of both toothings extend in the axial direction so that an axial displacement of second cam segment 25 on support shaft 3 is enabled and a rotation of second cam element 25 relative to support shaft 3 is prevented. Toothing 69 can be formed in one piece with support shaft 3 or embodied as shown in the form of a pressed-on tooth ring 67.

In addition to the toothing, FIG. 11 also shows a variant of coupling 33. In this variant, collar 44 is embodied so that it can engage around a collar of the first cam segment.

It should be noted that slide tracks 53 and 55 in FIG. 11 do not have a correct oblique profile which leads to a movement of second cam element 25. FIG. 11 only serves to illustrate both described construction variants, therefore a completely correct representation has been omitted. Of course, the slide tracks described with reference to the other figures can be easily combined with these variants.

Figure 12:
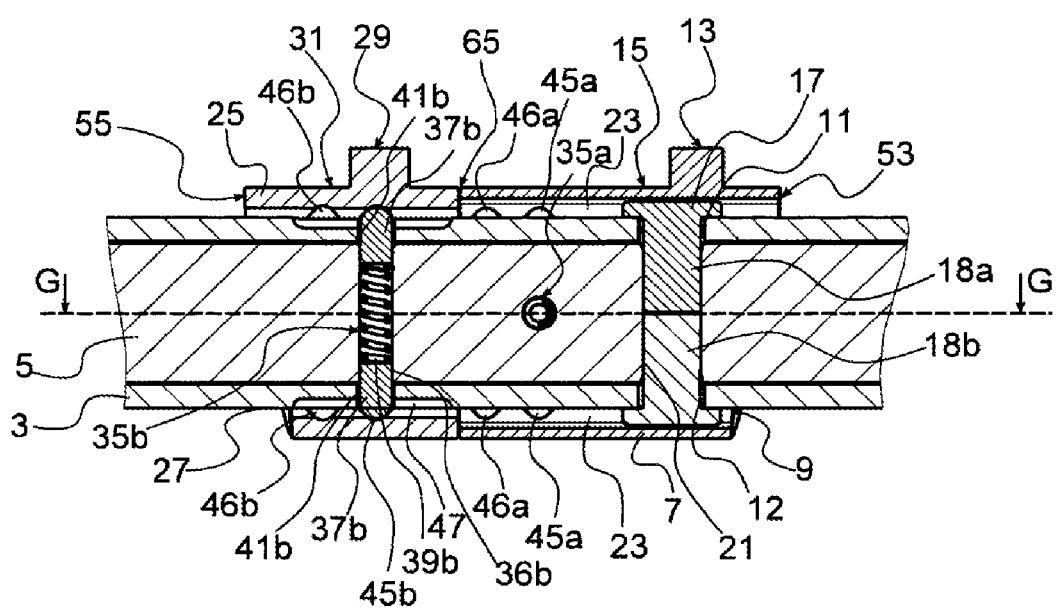
FIG. 12 is a partial side longitudinal cross-section view of a second embodiment of a camshaft of the present disclosure.
Figure 13:
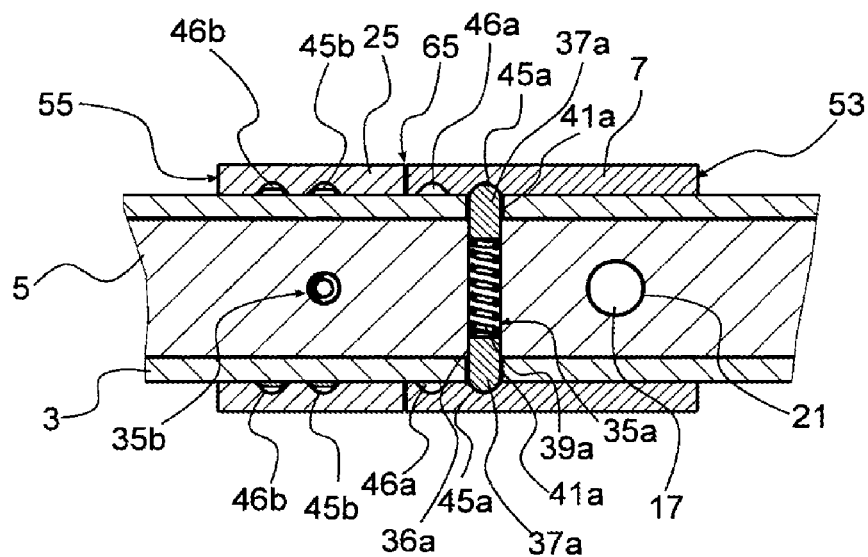
FIG. 13 is a partial side longitudinal cross-section view of the second embodiment of a camshaft of the present disclosure.
Figure 14:
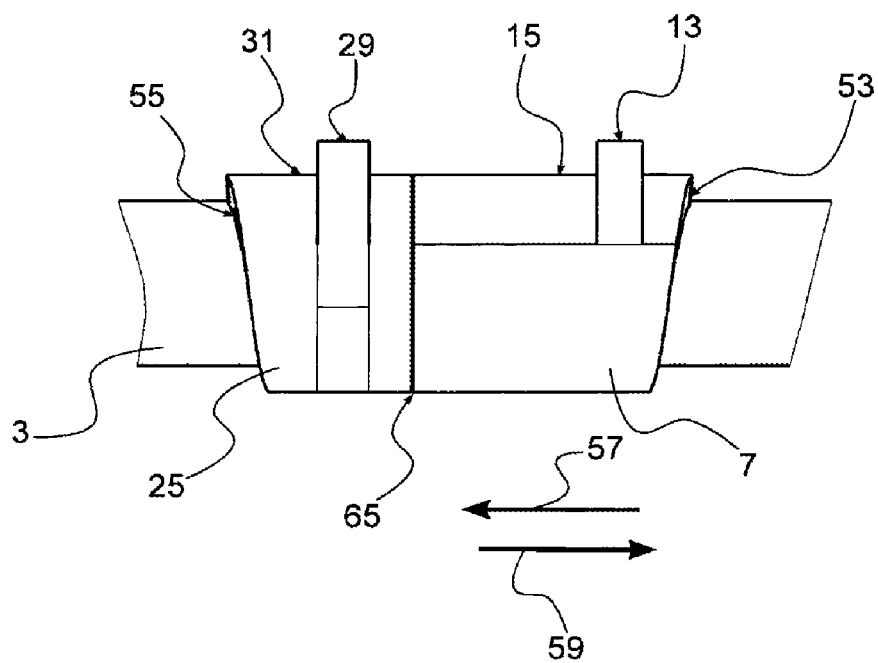
FIG. 14 is a partial side view of the second embodiment of a camshaft of the present disclosure.
Figure 15:
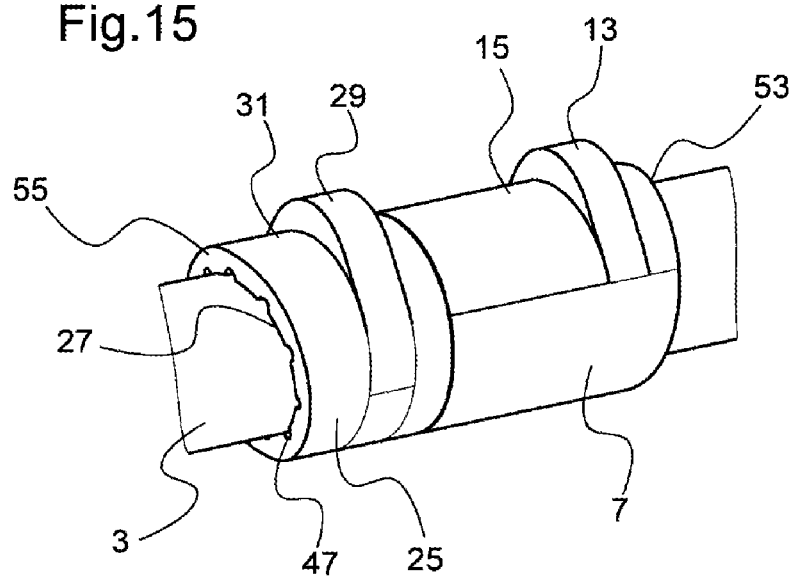
FIG. 15 is a partial isometric view of the second embodiment of a camshaft of the present disclosure.

FIGS. 12-15 show a second embodiment of the camshaft according to the invention. In each case a section through the camshaft is shown in FIGS. 12 and 13, wherein the sectional plane contains in both cases the axis of rotation of the camshaft. FIG. 14 shows a lateral view of the camshaft. FIG. 15 shows a three-dimensional representation of the second embodiment of the camshaft according to the invention.

FIG. 12 shows a longitudinal section of a camshaft 1 according to a second embodiment variant in a representation similar to FIG. 1. Camshaft 1 comprises a support shaft 3, which is formed as a hollow shaft, and an inner shaft 5 which is arranged concentrically in relation to support shaft 3. Inner shaft 5 is rotatable relative to support shaft 3. A first cam segment with a first recess 9 for receiving support shaft 3 is arranged on support shaft 3. Support shaft 3 has a first opening 11 via which first cam segment 7 is connected in a rotationally conjoint manner to inner shaft 5. First cam segment 7 is in contrast rotatable with respect to support shaft 3. First cam segment 7 has a first cam contour 13 and a second cam contour 15 which are offset in relation to one another in the axial direction. In the configuration represented in FIG. 12 of camshaft 1, first cam segment 7 is located at an axial position so that first cam contour 13 is active. Cam contour 15 is in contrast not active. According to the invention, first cam segment 7 is displaceable relative to inner shaft 5 and to support shaft 3. First cam segment 7 can therefore be displaced to the right (in this representation) so that second cam contour 15 moves to the axial position of first cam contour 13. In this case, second cam contour 15 would then be active since it is located at the correct axial position in order to bring about an actuation of a cylinder valve.

In the represented embodiment, second cam contour is, however, embodied as a zero stroke so that no cylinder valve actuation is carried out even if second cam contour 15 is active. As already explained in relation to FIG. 1, the embodiment as a zero stroke is not obligatory. Both cam contours 13 and 15 can, for example, also differ in the stroke height, angular position or width of the cam contour in the circumferential direction. Both cam contours 13 and 15 can alternatively also be identical.

In addition to the displacement of first cam segment 7, first cam segment 7 can also be changed in its angular position to support shaft 3. To this end, first cam segment 7 is arranged rotatably on support shaft 3 and connected in a rotationally conjoint manner to inner shaft 5 via first opening 11 by means of pin 17. First cam segment 7 is thus also rotated in relation to support shaft 3 during rotation of inner shaft 7 relative to support shaft 3. So that pin 17 does not hinder the rotation of inner shaft 5 in relation to support shaft 3, first opening 11 in the circumferential direction is larger than the diameter of pin 17. Inner shaft 5 has a bore 21 for receiving pin 17. Pin 17 reaches through opening 11 in support shaft 3 and engages in an axial groove 23 in the inner side of first recess 9 of first cam segment 7. In the present case, pin 17 is in two pieces and comprises a first pin part 18a and a second pin part 18b. A one-piece embodiment of pin 17 is alternatively also possible.

In the case of the represented embodiment, bore 21 is embodied as a continuous bore and pin 17 reaches through first opening 11 and second opening 12 which is opposite first opening 11, wherein pin 17 with its opposite ends engages in two axial grooves 23 in the inner sides of recess 9 of first cam segment 7. Instead of such a symmetrical embodiment, it is also possible to form bore 21 in the form of a blind hole so that only one side of pin 17 reaches through a first opening 11 in support shaft 3 and engages in an axial groove 23.

A second cam segment 25 is arranged adjacent to first cam segment 7 on support shaft 3. Second cam segment 25 has a second recess 27 for receiving support shaft 3, a first cam contour 29 and a second cam contour 31. Second cam segment 25 thus has the same number of cam contours as first cam segment 7.

Second cam segment 25 is connected to support shaft 3 such that it, on one hand, is rotationally conjoint in relation to support shaft 3, but, on the other hand, is arranged axially displaceably on support shaft 3. This is realized in an analogous manner to the first embodiment with the help of indentations and bearing bodies. The toothing explained with reference to FIG. 11 can also alternatively be used.

First cam segment 7 and second cam segment 25 have a joint contact surface 65 which runs perpendicular to the axis of rotation of support shaft 3 so that first cam segment 7 is rotatable relative to second cam segment 25 without a displacement of first cam segment 7 or of second cam segment 25 being brought about during rotation. In contrast to the first embodiment, no coupling is provided between first cam segment 7 and second cam segment 25.

In the present case, each cam contour of first cam segment 7 is assigned a cam contour of second cam segment 25 and an associated joint axial position of first cam segment 7 and second cam segment 25. In the case of the joint axial position, both cam segments 7 and 25 are pushed together to stop so that they contact one another in contact surface 65. In order to fix both cam segments 7 and 25 at the joint axial position, a latching means 35a is provided which latches first cam segment 7 at one of the joint axial positions. A latching means 35b is correspondingly provided which latches second cam segment 25 at the joint axial position. Since both cam segments 7 and 25 in this variant are not coupled to one another, each of the two cam segments 7 and 25 must be separately latched.

Both latching means 35a and 35b comprise in each case a bore 36a and 36b in inner shaft 5 with two spring-loaded latching bodies 37a and 37b. Latching bodies 37a, 37b are movably mounted in the radial direction. This radial movement of latching body 37a, 37b is carried out with compression of spring 39a or 39b. Spring-loaded latching bodies 37a, 37b reach in each case through latching openings 41a and 41b in support shaft 3 and engage in a latching groove 45a or 45b in the inner side of second recess 27 of second cam segment 25. If first cam segment 7 and second cam segment 25 are displaced towards the second operating mode (i.e. to the right), springs 39a, 39b are initially compressed in order to enable displacement. At the assigned joint axial position, springs 39a and 39b then bring latching bodies 37a and 37b into engagement with other latching grooves 46a and 46b and thus fix the joint axial position. (The components of latching means 35a are only partially apparent in FIG. 13)

Both latching openings 41a, 41b and four latching grooves 45a, 45b, 46a and 46b have in each case an extent in the circumferential direction which is greater than the extent of latching body 37a or 37b in the circumferential direction so that latching bodies 37a, 37b do not hinder a rotation of inner shaft 5 relative to support shaft 3. Latching grooves 45a, 45b, 46a and 46b are in this case embodied to be entirely circumferential. This then enables a simpler manufacturing process. While bore 36b runs parallel to bore 21 for pin 17, bore 36a is perpendicular thereto (cf. FIG. 13). Any desired angles between the three bores are generally possible. Moreover, bores 21, 36a and 36b must not necessarily run radially. An oblique profile with components in the axial direction and radial direction is also possible.

A first slide track 53 is arranged at the end side, which faces away from second cam segment 25, of first cam segment 7. A first slide track 55 is arranged at the end side, which faces away from first cam segment 7, of second cam segment 25. The mode of operation of slide tracks 53 and 55 is explained below with reference to FIG. 14.

A longitudinal section through camshaft 1 according to the invention which runs perpendicular to the longitudinal section according to FIG. 12 is shown in FIG. 13. The longitudinal section contains line G-G which is represented in FIG. 12. Bores 17, 36a and 36b are clearly apparent in inner shaft 5. The section thus also shows the structure of latching means 35a with which first cam segment 7 is latched.

FIG. 14 shows a lateral overview of the camshaft according to the invention. In addition to the features already explained, FIG. 14 clearly shows a first slide track 53 and a second slide track 55. First cam segment 7 is moved in a first axial direction 57 towards second cam segment 25 with the help of first slide track 53. First slide track 53 is formed in the form of an end side of first cam segment 7 running at least in sections obliquely in relation to the circumferential direction and facing away from the second cam segment. A fixed pin is brought into contact radially with slide track 53 for movement of first cam segment 7. This occurs in a region of slide track 53 on which the distance of the slide track to contact surface 65 does not have its maximum value. Slide track 53 slides along the pin during rotation of camshaft 1. Since the pin is fixed in the axial direction, slide track 53 is displaced and thus first cam segment 7 is displaced in first axial direction 57 towards second cam segment 25. A force is thus exerted on second cam segment 25 via contact surface 65 so that second cam segment 25 is also displaced in the first axial direction. In an analogous manner, a displacement of second cam segment 25 can be brought about in second axial direction 59 towards first cam segment 7. To this end, second slide track 55 is formed in the form of an end side of second cam segment 25 running obliquely at least in sections and facing away from the first cam segment. First cam segment 7 is so to speak moved in second axial direction 59 during displacement of second cam segment 25 in second axial direction 59.

Since no coupling is provided in the case of this embodiment between first cam segment 7 and second cam segment 25, a joint movement of both cam segments 7 and 25 is brought about in that first cam segment 7 has a first slide track for movement of the first cam segment in first axial direction 57 towards the second cam segment and second cam segment 25 has a second slide track 55 for movement of second cam segment 25 in second axial direction 59 towards first cam segment 7. The joint movement is thus realized in interaction with joint contact surface 65 of both cam segments 7 and 25. To this end, the slide tracks do not have to be formed on the end sides. Groove-shaped slide tracks, as are used in the first embodiment, are also possible.

FIG. 15 shows a three-dimensional representation of the second embodiment of the camshaft according to the invention. As a result of the three-dimensional embodiment, indentations 47 are also apparent on the inner side of second recess 27 of second cam element 25. In these embodiments too, indentations 47 extend across the complete axial extent of second cam segment 25 and are therefore apparent on the end side.

Figure 16:
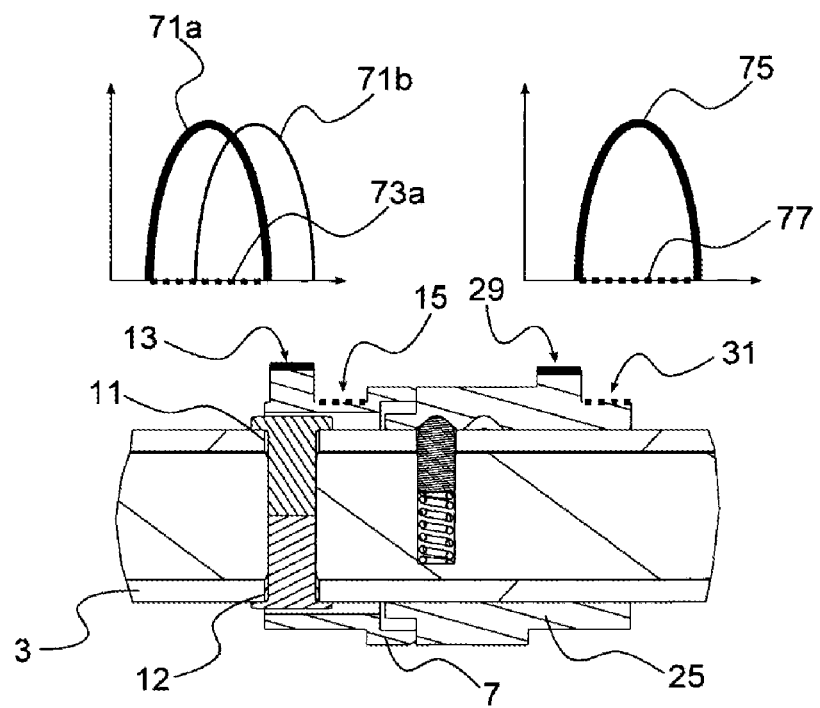
FIGS. 16 through 20 show partial longitudinal side cross-section views of various embodiments of a camshaft of the present disclosure together with valve stroke curve graphs for each respective embodiment of the camshaft.

FIG. 16 shows the mode of operation of the camshaft in conjunction with valve stroke curves. The lower part of FIG. 16 corresponds to FIG. 1. In order to ensure greater clarity, only selected parts are provided with reference numbers. Cam contours 13, 15, 29 and 31 are furthermore marked with continuous or dashed lines. The valve strokes which are brought about by the first cam segment are represented in the left-hand upper region of FIG. 16. The angle of rotation of the support shaft is plotted on the horizontal axis and the valve stroke in length units is plotted on the vertical axis. In the represented first operating mode of the camshaft, cam contour 13 is active and brings about valve stroke curve 71a. This valve stroke curve is represented by the same type of line by which the associated cam contour is also marked. If first cam segment 7 is displaced to the left so that second cam contour 15 moves to the axial position of first cam contour 13 so that second cam contour 15 is active and brings about valve stroke curve 73a. Valve stroke curve 73a is also represented by the same type of line by which associated cam contour 15 is also marked. The same correspondingly applies to all the following representations.

Since second cam contour 15 is embodied as zero stroke, valve stroke curve 73a lies on the horizontal axis. No valve stroke is therefore brought about. In addition to the displacement, first cam segment 7 is rotatable with respect to support shaft 3. Since the angle of rotation of the support shaft is plotted on the horizontal axis, a rotation of first cam segment 7 relative to support shaft 3 corresponds to a horizontal displacement of the valve stroke curve. First cam segment 7 can be varied continuously between two extreme rotational positions. In the first extreme rotational position, valve stroke curve 71a is brought about and valve stroke curve 71b in the second extreme rotational position. The horizontal distance between both valve stroke curves 71a and 71b is 30° in this case. This is the maximum angle of rotation by which first cam segment 7 can be rotated relative to the support shaft. The figure depends on the precise requirements. The figure is typically a compromise between as high as possible flexibility with a large maximum angle of rotation and a high stability of support shaft 3. The larger the angle of rotation, the larger openings 11 and 12 in the circumferential direction also have to be. This reduces the stability of the support shaft. Maximum angles of rotation in the region of 20°-30° are normal.

The valve stroke curves of second cam segment 25 are represented in an analogous manner in the right-hand upper region. Valve stroke curve 75 includes first cam contour 29 and valve stroke curve 77 includes second cam contour 31 of second cam segment 25. In this case, second cam contour 21 is also embodied as zero stroke. Valve stroke curve 77 thus lies on the horizontal axis.

Figure 17:
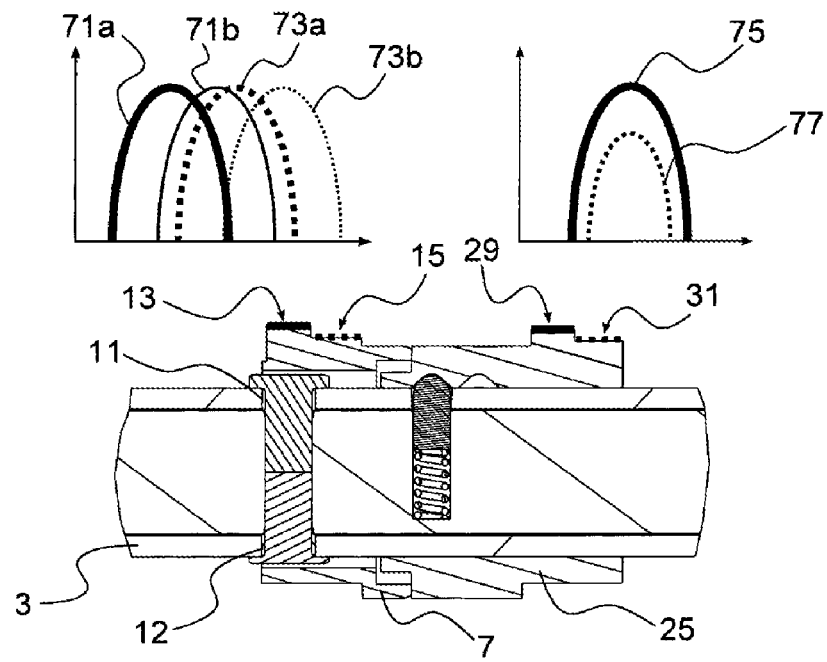

FIG. 17 shows a further embodiment in an analogous representation. In contrast to FIG. 16, second cam contour 15 of first cam segment 7 is in this case not embodied as zero stroke. Instead, second cam contour 15 brings about valve stroke curve 73a. This has the same maximum valve stroke as valve stroke curve 71a but is rotated by approx. 40° with respect to valve stroke curve 71a. Valve stroke curve 73a is therefore offset to the right by 40° with respect to valve stroke curve 71a. As a result of the rotation of both curves relative to one another, it appears in the lower part of FIG. 17 that the valve stroke would be larger as a result of cam contour 13 than in the case of cam contour 15. This is due to the fact that the shown cross-section contains the maximum of cam contour 13, but not the maximum of cam contour 15. In addition, first cam segment can be varied continuously between two extreme rotational positions. In the first extreme rotational position, valve stroke curves 71a or 73a (depending on the displacement position) are brought about and valve stroke curves 71b and 73b in the second extreme rotational position. The horizontal distance between both valve stroke curves is in each case 30°. In the event of actuation of the valves, the controlling valve stroke curve can thus be varied by up to 70°: A continuous variation of 30° between curves 71a and 71b by rotation, a jump by 10° to curve 73a by displacement and a further continuous variation by a further 30° up to curve 73b. The jump can of course be avoided in that valve stroke curve 73a has a horizontal distance from curve 17a which is smaller than or equal to the horizontal distance of curves 71a and 71b. In contrast to known camshafts, a significantly larger adjustment range is therefore provided according to the invention.

In the right-hand upper region of FIG. 17, the valve stroke curves of second cam segment 25 are represented in an analogous manner. Valve stroke curve 75 includes first cam contour 29 and valve stroke curve 77 includes second cam contour 31 of second cam segment 25. In this case, second cam contour 31 is embodied so that a valve stroke curve 77 is produced which has the maximum at the same angle as valve stroke curve 75. However, the amplitude, i.e. the maximum valve stroke, in the case of valve stroke curve 77 is approximately 30% smaller than in the case of valve stroke curve 75.

Figure 18:
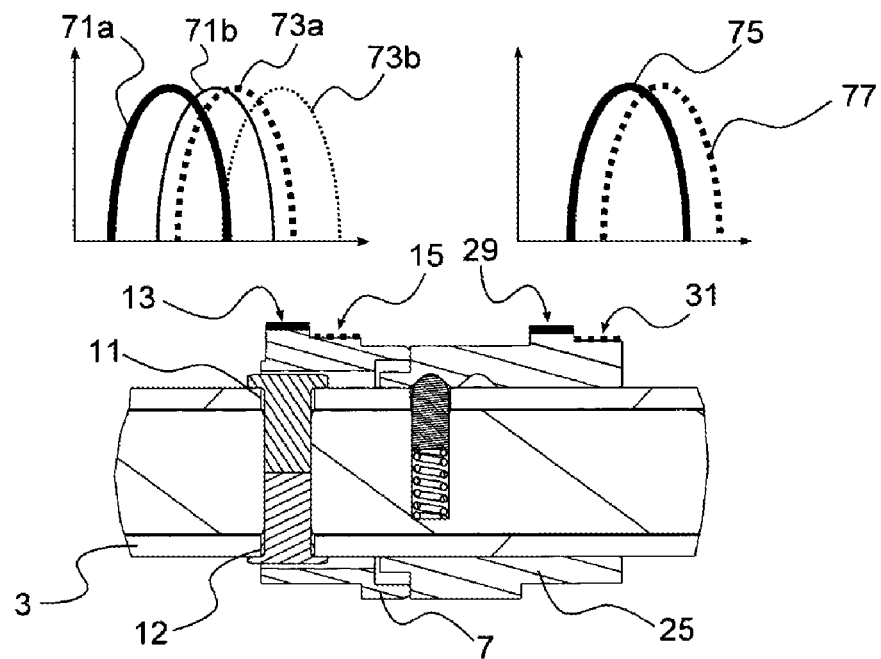

FIG. 18 shows a further variant of the camshaft according to the invention. While first cam segment 7 has an identical structure to the embodiment according to FIG. 17, second cam segment 25 has two cam contours 29 and 31 which differ in their angular position. In the case of this variant, associated valve stroke curves 75 and 77 have the same amplitude but are rotated at an angle of approximately 20° to one another.

Figure 19:
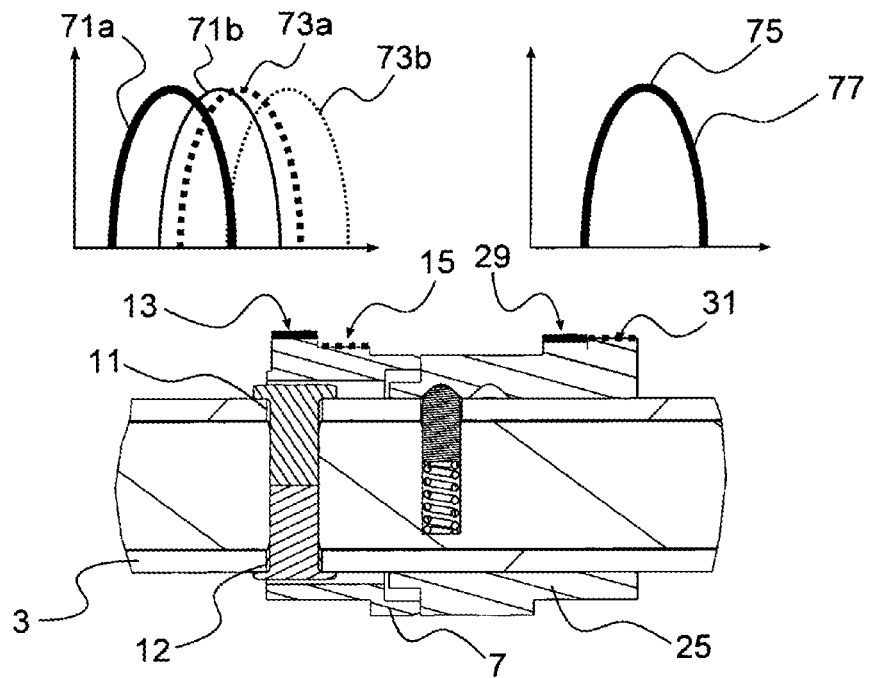

FIG. 19 shows a further variant of the camshaft according to the invention. In the case of this variant, both cam contours 29 and 31 of second cam segment 25 are identical. The cross-section of the second cam segment therefore does not change between both identical cam contours 29 and 31. Both valve stroke curves 75 and 77 coincide.

Figure 20:
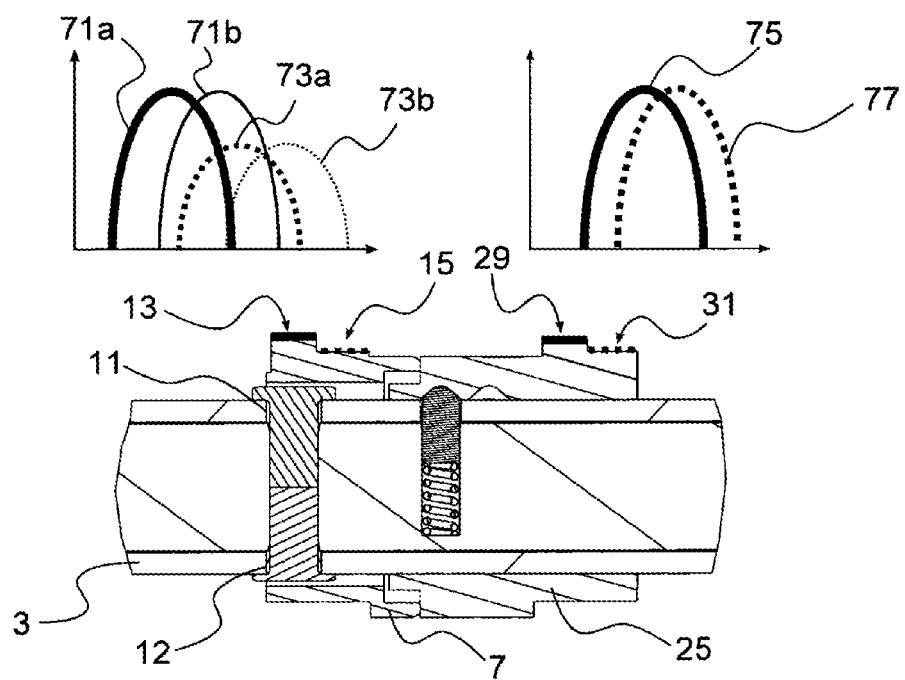

An embodiment variant which corresponds substantially to the embodiment according to FIG. 18 is shown in FIG. 20. However, in this case, the amplitude, i.e. the maximum valve stroke, of second cam contour 15 of first cam segment 7 is approximately 40% smaller than the amplitude of first cam contour 13.

By way of example, FIGS. 16 to 20 show that the camshaft according to the invention enables various possible variations for setting the valve stroke curves.

Figure 21:
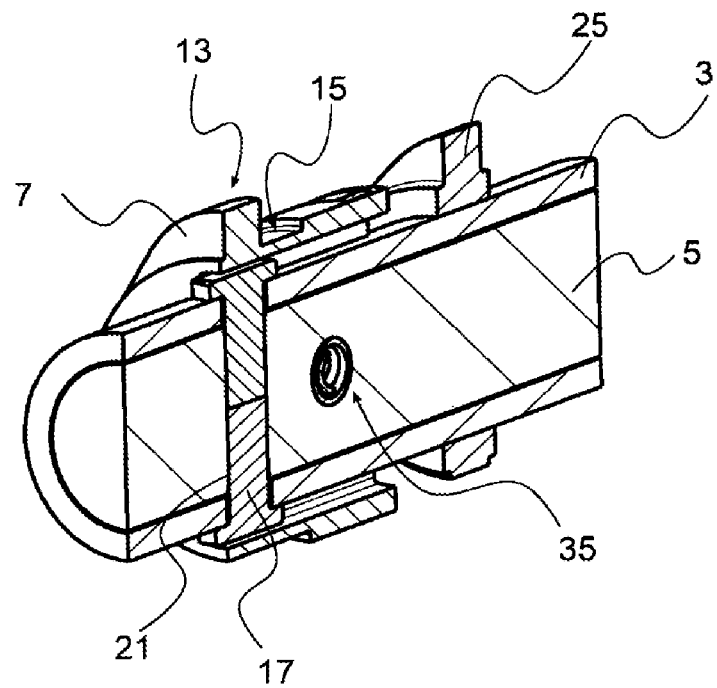
FIG. 21 is an isometric longitudinal cross-section view of an embodiment of a camshaft of the present disclosure having a fixed second cam segment.
Figure 22:
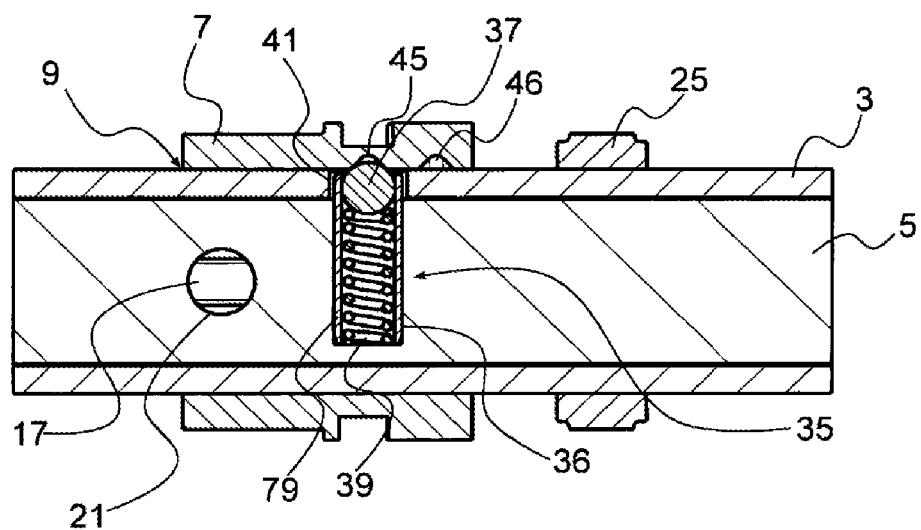
FIG. 22 is a side cross-section view of the camshaft of FIG. 21.

FIGS. 21 and 22 show a further embodiment of the camshaft according to the invention. FIG. 21 shows a three-dimensional representation with a longitudinal section through the camshaft. The sectional plane in FIG. 21 lies in an analogous manner to FIG. 1. A section perpendicular to this is represented in FIG. 22. The sectional plane therefore runs in an analogous manner to FIG. 2. In the case of this embodiment variant, first cam segment 7 is rotatable with respect to support shaft 3 and is axially displaceable relative to support shaft 3 and to inner shaft 5. In contrast, second cam segment 25 is connected fixedly to the support shaft. In order to latch first cam segment at a latching position, its latching means 35 is provided. Latching means 35 comprises a bore 36 in the form of a blind hole. A sleeve 79 is arranged in the bore, which sleeve 79 extends through latching opening 41 up to the outer diameter of support shaft 3. A spring-loaded latching body which is movably mounted in the radial direction is arranged in the sleeve. This reaches through latching opening 41 in support shaft 3 and engages in latching groove 45 in the inner side of first recess 9 of first cam segment 7. Latching body 37 formed as a ball is pushed by spring 39 into latching groove 45 so that a positive locking in the axial direction is produced. In the case of this variant of the invention, bore 36 for latching means 35 runs perpendicular to bore 21 for pin 17. In this case too, the latching means can also comprise a continuous bore, instead of a blind hole (cf. FIG. 12). Latching means 35 would then have a symmetrical structure of two balls with springs lying therebetween in a sleeve.

Figure 23:
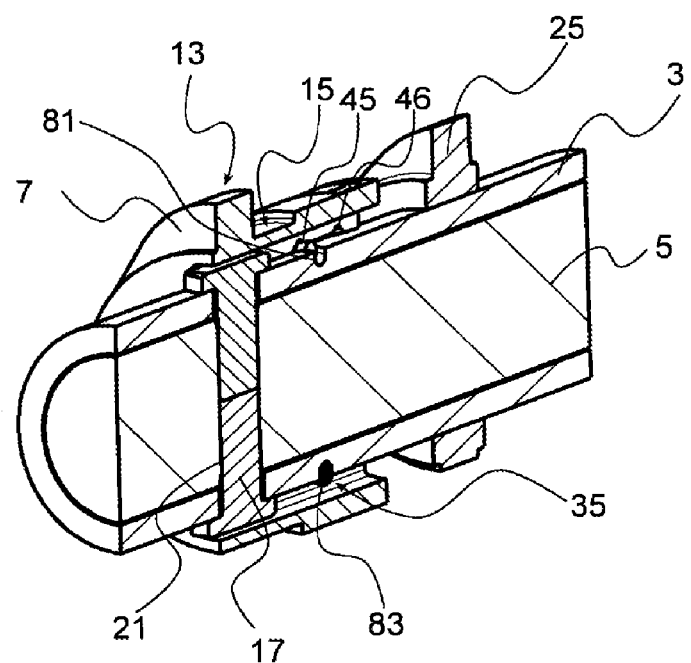
FIG. 23 is an isometric longitudinal cross-section view of an embodiment of a camshaft of the present disclosure having a round wire ring as a latching means.
Figure 24:
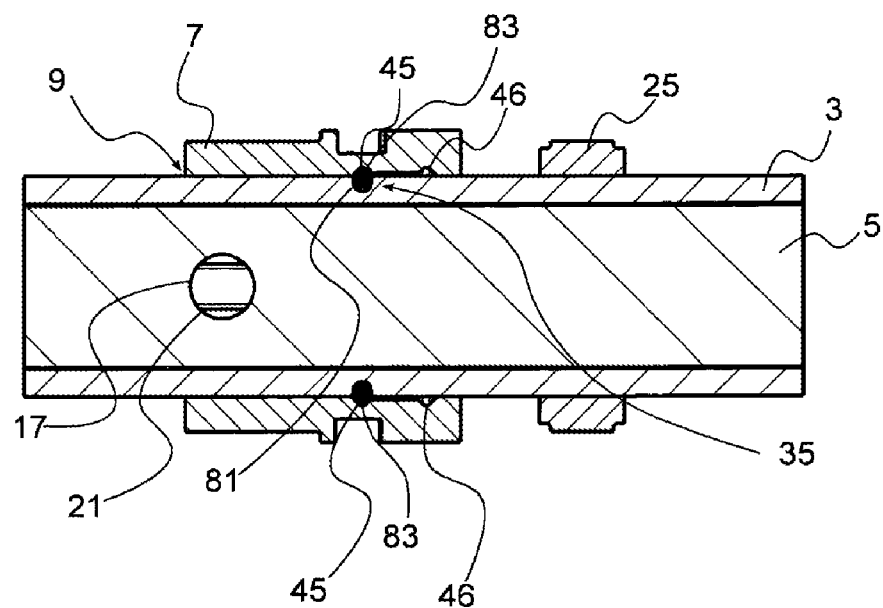
FIG. 24 is a side cross-section view of the camshaft of FIG. 23.

FIGS. 23 and 24 shows a further embodiment of the invention. In contrast to the variant represented in FIGS. 21 and 22, a different latching means 35 is used here. Support shaft 3 has a circumferential groove 81 into which a round wire ring 83 is placed. Round wire ring 83 engages both in groove 81 and in latching groove 45. If first cam segment 7 is displaced, round wire ring 83 is elastically deformed. As soon as other latching groove 46 is opposite groove 81, round wire ring 83 is deformed again and produces a positive locking in the axial direction. A latching of the first cam segment is achieved in each case in this manner.

Figure 25:
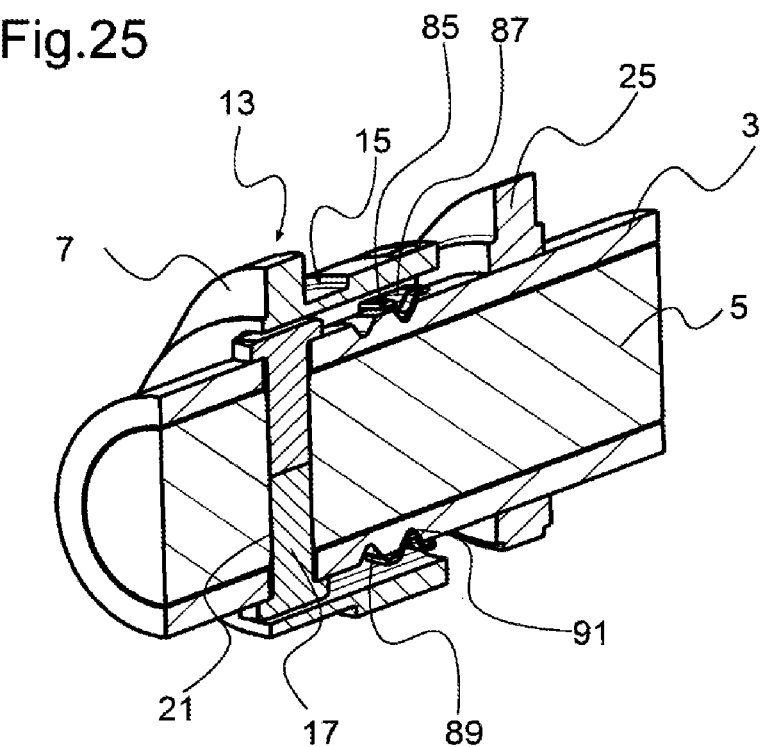
FIG. 25 is an isometric longitudinal cross-section view of an embodiment of a camshaft of the present disclosure having a spring ring as a latching means.
Figure 26:
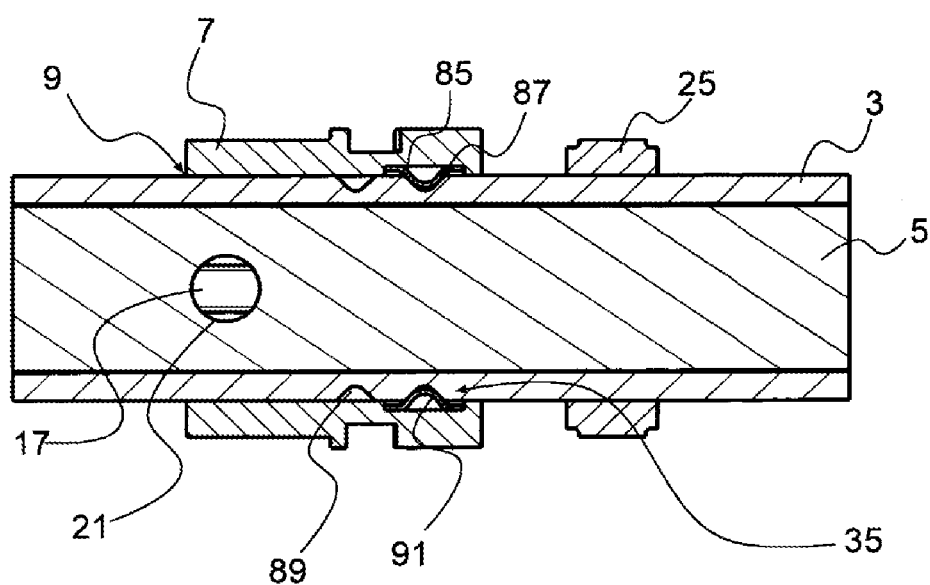
FIG. 26 is a side cross-section view of the camshaft of FIG. 25.

A further variant of the invention with a different latching means 35 is represented in FIGS. 25 and 26. In this case, first cam segment 7 has a circumferential groove 85 into which a spring ring 87 is placed. Spring ring 87 engages in a latching groove 89 in support shaft 3. During displacement of first cam segment 7, the spring ring is elastically deformed. As soon as spring ring 89 second latching groove 91 was displaced up to other latching groove 91, it deforms again and engages in circumferential latching groove 91 of support shaft 3. This ensures a stable latching of first cam segment 7.

The various described latching means can of course also be used in the embodiments in which the first and second cam segment are displaceable.

The exemplary embodiments can furthermore also be extended to three or more cam contours for each cam segment in order to achieve greater flexibility. In such a case, additional latching grooves are then correspondingly provided in order to latch the cam segments at the required axial position.

Figure 27:
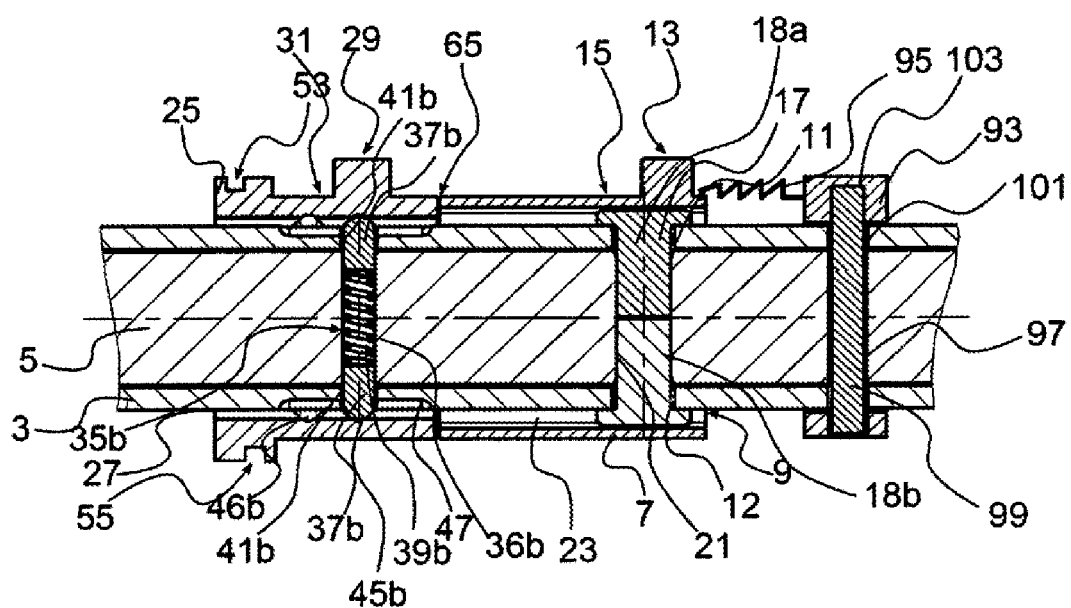
FIG. 27 is a partial side longitudinal cross-section view of a section of a third embodiment of a camshaft of the present disclosure.

FIG. 27 shows a longitudinal section of a camshaft 1 according to a third embodiment variant. Camshaft 1 comprises a support shaft 3, which is formed as a hollow shaft, and an inner shaft 5 which is arranged concentrically in relation to support shaft 3. Inner shaft 5 is rotatable relative to support shaft 3. A first cam segment 7 with a first recess 9 for receiving support shaft 3 is arranged on support shaft 3. Support shaft 3 has a first opening 11 via which first cam segment 7 is connected in a rotationally conjoint manner to inner shaft 5. In contrast, first cam segment 7 is rotatable with respect to support shaft 3. First cam segment 7 has a first cam contour 13 and a second cam contour 15 which are offset to one another in the axial direction. In the configuration represented in FIG. 27 of camshaft 1, first cam segment 7 is located at an axial position so that first cam contour 13 is active. Cam contour 15 is in contrast not active. According to the invention, first cam segment 7 is displaceable relative to inner shaft 5 and to support shaft 3. First cam segment 7 can therefore be displaced to the right (in this representation) so that second cam contour 15 moves to the axial position of first cam contour 13. In this case, second cam contour 15 would then be active since it is located at the correct axial position in order to bring about an actuation of a cylinder valve. In the case of the represented embodiment, the second cam contour is, however, embodied as a zero stroke so that even if second cam contour 15 is active, no cylinder valve actuation is carried out. As already explained in relation to FIG. 1, the embodiment as zero stroke is not essential. Both cam contours 13 and 15 can, for example, also differ in terms of stroke height, angular position or width of the cam contour in the circumferential direction. Alternatively, both cam contours 13 and 15 can also be identical.

In addition to the displacement of first cam segment 7, first cam segment 7 can also be changed in its angular position in relation to support shaft 3. To this end, first cam segment 7 is arranged rotatably on support shaft 3 and connected in a rotationally conjoint manner to inner shaft 5 via first opening 11 by means of pin 17. First cam segment 7 is thus also rotated with respect to support shaft 3 during rotation of inner shaft 5 relative to support shaft 3. So that pin 17 does not hinder the rotation of inner shaft 5 in relation to support shaft 3, first opening 11 in the circumferential direction is larger than the diameter of pin 17. Inner shaft 5 has a bore 21 for receiving pin 17. Pin 17 reaches through opening 11 in support shaft 3 and engages in an axial groove 23 in the inner side of first recess 9 of first cam segment 7. In the present case, pin 17 is in two pieces and comprises a first pin part 18a and a second pin part 18b. A one-piece embodiment of pin 17 is alternatively also possible.

In the case of the represented embodiment, bore 21 is embodied as a continuous bore and pin 17 reaches through first opening 11 and second opening 12 which is opposite first opening 11, wherein pin 17 engages with its opposing ends in two axial grooves 23 in the inner sides of recess 9 of first cam segment 7. Instead of such a symmetrical embodiment, it is also possible to form bore 21 in the form of a blind hole so that only one side of pin 17 reaches through a first opening 11 in support shaft 3 and engages in an axial groove 23.

A second cam segment 25 is arranged on support shaft 3 adjacent to first cam segment 7. Second cam segment 25 has a second recess 27 for receiving support shaft 3, a first cam contour 29 and a second cam contour 31. Second cam segment 25 thus has the same number of cam contours as first cam segment 7.

Second cam segment 25 is connected to support shaft 3 such that it is on one hand rotationally conjoint in relation to support shaft 3, but on the other hand is arranged axially displaceably on support shaft 3. This is realized in an analogous manner to the first embodiment with the help of indentations and bearing bodies. Alternatively, the toothing explained with reference to FIG. 11 can also be used.

First cam segment 7 and second cam segment 25 have a joint contact surface 65 which runs perpendicular to the axis of rotation of support shaft 3 so that first cam segment 7 is rotatable relative to second cam segment 25 without a displacement of first cam segment 7 or of second cam segment 25 being brought about during rotation. In an analogous manner to the second embodiment, no coupling is provided between first cam segment 7 and second cam segment 25.

In the present case, each cam contour of first cam segment 7 is assigned a cam contour of second cam segment 25 and an associated joint axial position of first cam segment 7 and second cam segment 25. In the case of the joint axial position, both cam segments 7 and 25 are pushed together to stop so that they contact one another in contact surface 65.

In order to fix both cam segments 7 and 25 at the joint axial position, a latching means 35b is provided which latches second cam segment 25 at one of the joint axial positions. First cam segment 7 is tensioned by a spring element 95 against second cam segment 25. The axial position of first cam segment 7 is thus fixed by virtue of the fact that first cam segment 7 is pushed by the restoring force of spring element 95 against second cam segment 25, wherein second cam segment 25 is fixed via latching means 35b. Spring element 95 is supported on support element 93 which is connected rotatably to support shaft 3 and in a rotationally conjoint manner to inner shaft 5. The rotationally conjoint connection to inner shaft 5 is realized in that inner shaft 5 has a bore 97 with a pin 99 which reaches through an opening 101 in support shaft 3 and engages in a recess 103 of support element 93.

Latching means 35b comprises a bore 36b in inner shaft 5 with two spring-loaded latching bodies 37b. Latching bodies 37b are mounted movably in the radial direction. This radial movement of latching bodies 37b is carried out with compression of spring 39b. Spring-loaded latching bodies 37b reach through two latching openings 41b in support shaft 3 and engage in a latching groove 45b in the inner side of second recess 27 of second cam segment 25. If second cam segment 25 is displaced towards the second operating mode (i.e. to the right), spring 39b is initially compressed in order to enable displacement. At the assigned joint axial position, spring 39b then brings latching bodies 37b into engagement with other latching groove 46b and thus fixes the axial position of second cam segment 25. At the same time, second cam segment 25 displaces first cam segment 7 against the restoring force of spring element 95 in the direction of support element 93. By fixing the axial position of the second cam element with the help of latching means 25, the axial position of first cam element 7 is thus also fixed. If second cam segment 25 is displaced back towards the first operating mode (i.e. to the left), spring element 95 is at least partially relaxed and also displaces the first cam segment to the assigned axial position of the first operating mode. It is also possible that spring element 95 in the first operating mode is fully relaxed and the fixing of first cam segment 7 in the first operating mode is only carried out by positive locking without spring element 95 exerting a significant force on first cam segment 7.

Even if in this embodiment no coupling is established between both cam segments 7 and 25, both cam segments 7 and 25 are however only jointly displaceable as a result of spring element 95. Spring element 95 is represented schematically as a helical spring in FIG. 27. Spring element 95 is preferably formed as an annular plate spring or diaphragm spring which is arranged between support element 93 and second cam segment 7 on support shaft 3.

The second cam segment has a first slide track 53 and a second slide track 55 for displacement of second cam segment 25. The mode of operation of the slide tracks is explained with reference to FIGS. 6 and 6a.

Both latching opening 41b and two latching grooves 45b and 46b have in each case an extent in the circumferential direction which is greater than the extent of latching body 37b in the circumferential direction so that latching body 37bb does not hinder a rotation of inner shaft 5 relative to support shaft 3. Latching grooves 45b and 46b are in this case embodied to be fully circumferential. This then enables a simpler production method. Opening 101 correspondingly has an extent in the circumferential direction which is greater than the extent of pin 99 in the circumferential direction so that pin 99 does not hinder a rotation of inner shaft 5 relative to support shaft 3.

In the event of a rotation of inner shaft in relation to support shaft 3, both first cam segment 7 and supporting element 93 are rotated relative to the support shaft since both are connected in a rotationally conjoint manner to inner shaft 5. The radial relative position of first cam segment 7 and support element 93 is thus maintained during rotation of inner shaft 5 in relation to support shaft 3. No movement between spring element 95 and first cam segment 7 or between spring element 95 and support element 93 thus arises. No friction accordingly occurs which would have to be overcome by a greater force outlay in the case of rotation of inner shaft 5 in relation to support shaft 3. Alternatively, supporting element 93 can also be connected in a rotationally conjoint manner to support shaft 5. In this case, a plain bearing is then arranged between spring element 95 and first cam segment 7 or between spring element 95 and supporting element 93. It is achieved by the plain bearing that a rotation of the second cam segment relative to supporting element 93 is not hindered by connecting spring element 95.

In the case of the embodiment represented in FIG. 27, the axial displacement and the latching of both cam segments 25 and 7 is achieved by virtue of the fact that second cam segment 25 is moved by means of slide tracks 53 and 55 and is latched by means of latching means 35b. First cam segment 7 only follows the axial movement of second cam segment 25. The reverse structure can also analogously be realized so that latching means and slide tracks are arranged on first cam segment 7 and instead second cam segment 25 is tensioned by a spring element against the first cam segment. In the case of this variant, the second cam segment then follows the displacement of the first cam segment. It is also possible in an analogous manner in this variant to either connect the supporting element in a rotationally conjoint manner to the inner shaft or in a rotationally conjoint manner to the support shaft.

What is claimed is:

1. A camshaft comprising:
a support shaft having a hollow longitudinal interior cavity defined there through and a first opening defined through a sidewall thereof;
an inner shaft concentrically disposed in said hollow interior cavity of said support shaft and rotatable relative to said support shaft about a longitudinal axis; and
a first cam segment having at least two cam contours defined thereon and a first recess defined therein through which said support shaft is received, said first cam segment being:
rotatably disposed on an outer surface of said support shaft about said longitudinal axis,
axially and operably displaceable with respect to each of said support shaft and said inner shaft, and
coupled in a rotationally conjoint manner to said inner shaft through said first opening in said sidewall of said support shaft such that said inner shaft and first cam segment rotate together with respect to said support shaft.

2. The camshaft of claim 1, further comprising:
a bore defined in a side of said inner shaft;
an axial groove defined in an inner side of said first recess of said first cam segment; and
a pin disposed in said bore and protruding through said first opening in said sidewall of said support shaft and extending above said outer surface of said support shaft such that it is engaged in said axial groove of said first cam segment.

3. The camshaft of claim 2, wherein said first cam segment is configured to be guided during an axial displacement thereof by movement of said axial groove along said pin.

4. The camshaft of claim 1, further comprising:
a second cam segment disposed on the outer surface of said support shaft adjacent said first cam segment, and axially displaceable with respect to said support shaft, said second cam segment having at least two cam contours defined thereon and a second recess defined therein through which said support shaft is received, said second cam segment being coupled to said support shaft such that said support shaft and second cam segment rotate together about said longitudinal axis.

5. The camshaft of claim 4, wherein an inner surface of said second recess of said second cam segment defines at least a first indentation, and wherein said outer surface of said support shaft defines at least a second indentation opposing said first indentation, said opposing first and second indentations together defining at least one cavity, the camshaft further comprising at least one bearing body disposed in said at least one cavity.

6. The camshaft of claim 5, wherein said first and second indentations are wider in an axial direction than said at least one bearing body so as to permit an axial displacement of said second cam segment on said support shaft.

7. The camshaft of claim 5, wherein said first and second indentations have a width in a circumferential direction that is substantially equal to a width of said at least one bearing body, so as to prevent rotation of said second cam segment with respect to said support shaft.

8. The camshaft of claim 4, wherein said outer surface of said support shaft comprises a first set of teeth disposed thereon and protruding therefrom, and wherein an inner side of said second recess of said second cam segment comprises a second set of teeth disposed thereon and protruding therefrom that engages with said first set of teeth, wherein teeth grooves of each of said first and second set of teeth are axially oriented so as to permit an axial displacement of said second cam segment on said support shaft and prevent a rotation of said second cam segment with respect to said support shaft about said longitudinal axis.

9. The camshaft of claim 4, wherein said first and second cam segments are coupled to each other such that said first cam segment is rotatable about said longitudinal axis with respect to said second cam segment, and said first and second cam segments are only jointly displaceable in an axial direction.

10. The camshaft of claim 4, wherein said first cam segment comprises a first joint contact surface and said second cam segment comprises a second joint contact surface that is in contact with said first contact surface, each of said first and second contact surfaces running perpendicular to said longitudinal axis such that said first cam segment is rotatable relative to said second cam segment without an axial displacement of either of said first or second cam segments.

11. The camshaft of claim 10, further comprising a spring element configured to bias at least one of said first or second cam segment against the other of said first or second cam segment.

12. The camshaft of claim 4, further comprising at least a first slide track defined in at least one of said first or second cam segment and configured to jointly move said first and second cam segments in a first axial direction, and at least a second slide track defined in at least one of said first or second cam segment and configured to jointly move said first and second cam segments in a second axial direction that is opposite to said first axial direction.

13. The camshaft of claim 12, wherein said first and second slide tracks are each defined in said second cam segment.

14. The camshaft of claim 4, wherein said first cam segment comprises a first slide track defined therein that is configured to move said first cam segment in a first axial direction towards said second cam segment, and wherein said second cam segment comprises a second slide track defined therein that is configured to move said second cam segment in a second axial direction towards said first cam segment.

15. The camshaft of claim 4, wherein the at least two cam contours of the first cam segment comprise a first cam contour and a second cam contour, wherein the at least two cam contours of the second cam segment comprise a first cam contour and a second cam contour, wherein when said first and second cam segments are jointly positioned at a first axial position on said support shaft, the first cam contour of said first cam segment and the first cam contour of said second cam segment are active, and wherein when said first and second cam segments are jointly positioned at a second axial position on said support shaft, the second cam contour of said first cam segment and the second cam contour of said second cam segment are active.

16. The camshaft of claim 15, further comprising a latching means configured to secure said first cam segment in place at one of said first and second axial positions along said support shaft.

17. The camshaft of claim 15, further comprising a latching means configured to secure said second cam segment in place at one of said first and second axial positions along said support shaft.

18. A camshaft comprising:
a support shaft having a hollow longitudinal interior cavity defined there through and a first opening defined through a sidewall thereof;
an inner shaft concentrically disposed in the hollow interior cavity of the support shaft and rotatable relative to the support shaft about a longitudinal axis; and
a first cam segment having at least two cam contours defined thereon and a first recess defined therein through which the support shaft is received, the first cam segment being:
rotatably disposed on an outer surface of the support shaft about the longitudinal axis,
axially displaceable with respect to each of the support shaft and the inner shaft, wherein relative to the inner shaft the first cam segment is axially and operably displaceable by an amount that corresponds to an axial distance separating axial-midpoints of the at least two cam contours, and
coupled in a rotationally conjoint manner to the inner shaft through the first opening in the sidewall of the support shaft such that the inner shaft and first cam segment rotate together with respect to the support shaft.

19. A camshaft comprising:
a support shaft having a hollow longitudinal interior cavity defined there through and a first opening defined through a sidewall thereof;
an inner shaft concentrically disposed in said hollow interior cavity of said support shaft and rotatable relative to said support shaft about a longitudinal axis; and
a first cam segment having at least two cam contours defined thereon and a first recess defined therein through which said support shaft is received, said first cam segment being:
rotatably disposed on an outer surface of said support shaft about said longitudinal axis,
axially displaceable with respect to each of said support shaft and said inner shaft, and
coupled in a rotationally conjoint manner to said inner shaft through said first opening in said sidewall of said support shaft such that said inner shaft and first cam segment rotate together with respect to said support shaft, wherein the first cam segment remains coupled in the rotationally conjoint manner to the inner shaft as the first cam segment is axially displaced.

20. The camshaft of claim 19 wherein the first cam segment is axially displaceable between
a first axial position where a first cam contour of the first cam segment is active in a first operating mode, and
a second axial position where a second cam contour of the first cam segment is active in a second operating mode.

* * * * *